United States Patent
de Jong et al.

(10) Patent No.: US 8,152,385 B2
(45) Date of Patent: Apr. 10, 2012

(54) DUPLEX FIBER OPTIC ASSEMBLIES SUITABLE FOR POLARITY REVERSAL AND METHODS THEREFOR

(75) Inventors: Michael de Jong, Colleyville, TX (US); Ashley W. Jones, Denton, TX (US); Harley J. Staber, Coppell, TX (US)

(73) Assignee: Corning Cable Systems LLC, Hickory, NC (US)

( * ) Notice: Subject to any disclaimer, the term of this patent is extended or adjusted under 35 U.S.C. 154(b) by 255 days.

(21) Appl. No.: 12/394,524

(22) Filed: Feb. 27, 2009

(65) Prior Publication Data

US 2010/0220961 A1  Sep. 2, 2010

(51) Int. Cl.
G02B 6/38 (2006.01)

(52) U.S. Cl. .............. 385/71; 385/53; 385/55; 385/70; 385/72

(58) Field of Classification Search .......... 385/53, 385/55, 70–72
See application file for complete search history.

(56) References Cited

U.S. PATENT DOCUMENTS

| | | | |
|---|---|---|---|
| 3,600,846 A | 8/1971 | Peters .......................... 46/47 |
| 4,611,887 A * | 9/1986 | Glover et al. ................. 385/71 |
| 4,645,295 A | 2/1987 | Pronovost .................. 350/96.2 |
| 4,787,706 A | 11/1988 | Cannon, Jr. et al. ......... 350/96.2 |
| 5,123,071 A | 6/1992 | Mulholland et al. ............ 385/53 |
| 5,166,995 A | 11/1992 | Briggs et al. .................. 385/58 |
| 5,253,315 A | 10/1993 | Fentress ........................ 385/78 |
| 5,259,052 A | 11/1993 | Briggs et al. .................. 385/78 |
| 5,333,221 A | 7/1994 | Briggs et al. .................. 385/55 |
| 5,398,295 A | 3/1995 | Chang et al. ................... 385/58 |
| 5,521,997 A | 5/1996 | Rovenolt et al. ............... 385/77 |
| 5,574,812 A | 11/1996 | Beier et al. .................... 385/78 |
| 5,579,425 A | 11/1996 | Lampert et al. ................ 385/59 |
| 5,675,682 A | 10/1997 | De Marchi .................... 385/77 |
| 6,250,817 B1 | 6/2001 | Lampert et al. ................ 385/56 |
| 6,357,934 B1 | 3/2002 | Driscoll et al. ................ 385/86 |
| 6,364,537 B1 | 4/2002 | Maynard ....................... 385/75 |
| 6,364,685 B1 | 4/2002 | Manning ..................... 439/357 |
| 6,409,392 B1 | 6/2002 | Lampert et al. ................ 385/56 |
| 6,511,230 B1 | 1/2003 | Connelly et al. .............. 385/58 |
| 6,565,262 B2 | 5/2003 | Childers et al. ................ 385/76 |
| 6,634,796 B2 | 10/2003 | de Jong et al. ................. 385/56 |
| 6,672,898 B2 | 1/2004 | Kahle et al. ................. 439/540.1 |
| 6,848,838 B2 | 2/2005 | Doss et al. .................... 385/81 |
| 6,869,227 B2 | 3/2005 | Del Grosso et al. ........... 385/71 |
| 6,932,515 B2 * | 8/2005 | Ngo ............................. 385/86 |
| 7,018,108 B2 | 3/2006 | Makhlin et al. ................ 385/78 |
| 7,031,574 B2 | 4/2006 | Huang et al. .................. 385/39 |
| 7,128,471 B2 | 10/2006 | Wilson ......................... 385/78 |

(Continued)

FOREIGN PATENT DOCUMENTS

DE 202006011910 4/2007

(Continued)

Primary Examiner — Jennifer Doan
(74) Attorney, Agent, or Firm — Michael E. Carroll, Jr.

(57) ABSTRACT

Duplex fiber optic connectors and fiber optic cable assemblies suitable for polarity reversal along with methods of polarity reversal are disclosed. The duplex fiber optic connector assemblies and fiber optic cable assemblies allow rotation of individual fiber optic connectors within the housing assembly for polarity reversal. In one embodiment, the duplex fiber optic cable assembly may use a single boot and a single fiber optic cable, thereby reducing the backside footprint of the cable assembly for improved access and/or airflow. In another embodiment, the housing of the duplex assembly has integral detents to limit rotation, and may further include a removable trigger mechanism and/or a rotatable boot to facilitate polarity reversal.

43 Claims, 25 Drawing Sheets

U.S. PATENT DOCUMENTS

| | | |
|---|---|---|
| 7,147,383 B2 | 12/2006 | Sullivan .................. 385/59 |
| 7,204,644 B2 | 4/2007 | Barnes et al. .................. 385/77 |
| 7,281,859 B2 | 10/2007 | Mudd et al. .................. 385/76 |
| 7,325,980 B2 | 2/2008 | Pepe .................. 385/86 |
| 7,338,214 B1 | 3/2008 | Gurreri et al. .................. 385/55 |
| 7,555,192 B2 | 6/2009 | Ishii et al. .................. 385/137 |
| 7,695,198 B1 | 4/2010 | Baechtle et al. .................. 385/69 |
| 2003/0190123 A1 | 10/2003 | Kahle et al. .................. 385/59 |
| 2003/0215171 A1 | 11/2003 | Lampert et al. .................. 385/11 |
| 2004/0047565 A1 | 3/2004 | Cheng et al. .................. 385/71 |
| 2004/0136657 A1 | 7/2004 | Ngo .................. 385/86 |
| 2006/0089049 A1 | 4/2006 | Sedor .................. 439/620 |
| 2006/0159399 A1 | 7/2006 | Erdman et al. .................. 385/53 |

FOREIGN PATENT DOCUMENTS

| | | |
|---|---|---|
| DE | 102006019335 | 10/2007 |
| EP | 1566674 A1 | 8/2005 |
| EP | 1767971 A1 | 3/2007 |
| EP | 1074868 B1 | 9/2007 |
| JP | 2005-189288 | 7/2005 |
| WO | WO01/79904 A2 | 10/2001 |

* cited by examiner

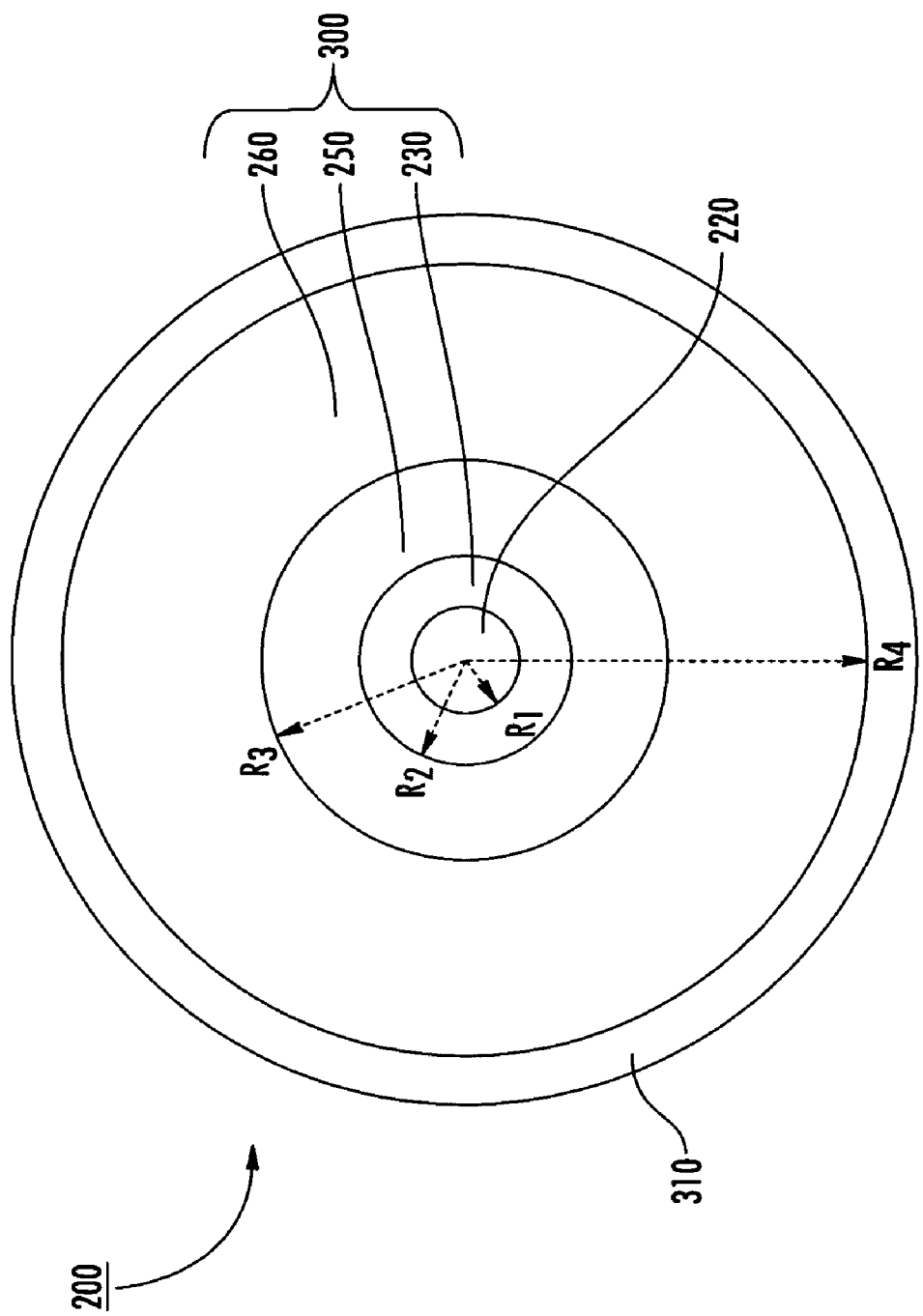

DUPLEX FIBER OPTIC ASSEMBLIES SUITABLE FOR POLARITY REVERSAL AND METHODS THEREFOR

BACKGROUND

1. Technical Field

The disclosure relates generally to fiber-optic assemblies used in telecommunication systems, and in particular relates to duplex fiber optic connector assemblies and fiber optic cable assemblies permitting polarity reversal along with methods therefor.

2. Technical Background

The capabilities of optical fiber, optical cable and fiber optic hardware continuously improve through research and innovation to meet the demands of increasing numbers of users. This is creating issues of density within even the most spacious data centers. As data centers become more densely configured one area of concern is cabling and airflow. Each piece of equipment within the data center is interconnected to other equipment or to different components within the same cabinet using jumper cables. Jumper cable assemblies typically comprise single fiber connectors and cables, i.e., simplex cable assemblies, usually arranged into sets of two, one input and one output, i.e., duplex cable assemblies.

Large numbers of jumper cable assemblies bunched together are an impediment to maximized air flow, creating blockages and decreasing cooling efficiency in the data center, which can in turn affect performance. One method of mitigating this issue is to integrate the standard two-cable duplex cable assembly into a single cable duplex jumper, reducing by half the number of cables required to service a given data center. While this does indeed decrease the total cable count and serve the intended purpose of improving air flow, there are other issues that arise.

Most multi-fiber cable assemblies used in data centers, including duplex jumpers, be they two-cable or single-cable designs, follow a polarity scheme established by Addendum 7 to ANSI/TIA/EIA/568B.1, *Guidelines for Maintaining Polarity Using Array Connectors* ('568B.1-A7). Polarity for duplex jumpers is typically either dedicated A-to-B or A-to-A, depending upon the application. Harnesses that break out array connectors, such as MTP, MPO or the like, from multi-fiber into single or double fiber cables with simplex connectors also follow the standards of polarity spelled out in '568B.1-A7. The craft can correct polarity miscues in typical duplex connector assemblies by disassembling and reassembling them into the preferred orientation. U.S. Pat. No. 6,565,262 discloses a duplex connector cable assembly employing a clip to secure two simplex connector cable assemblies together. It is obvious to one skilled in the art that the clip can be removed and the duplex connector cable assembly then reassembled into a different polarity configuration. However, the '262 patent does nothing to address the aforementioned cable crowding. U.S. Pat. App. No. 2008/0226237 discloses a duplex connector cable assembly with a single cable that addresses cable crowding issues, but does not address reversing the polarity. Thus, there is an unresolved need for a single cable, duplex connector cable assembly with the capability of polarity reversal in a quick, easy and reliable manner.

SUMMARY

Embodiments of the disclosure are directed to fiber optic connector assemblies and fiber optic cable assemblies that allow polarity reversal. One embodiment of the fiber optic cable assembly includes two fiber optic connectors secured in a housing having a fiber optic cable attached opposite the connectors, a trigger mechanism to engage the fiber optic connectors and a boot for strain relief. In one explanatory embodiment, the fiber optic connectors, housing, trigger mechanism, boot and fiber optic cable cooperate to enable polarity reversal. The housing includes at least one receptacle for receiving the fiber optic connectors in such a way so as to permit rotation of the same along their respective longitudinal axes. Additionally, the trigger mechanism aids in both the insertion and removal of the duplex connector assembly into and out of a patch panel, adapter or the like and is removable and repositionable on the housing for enabling polarity reversal. Further, the boot may provide some measure of retention for the removable trigger mechanism. Although, the disclosed embodiment discusses LC connectors, the concepts of the disclosure may be used with any suitable type of fiber connector. Other variations and embodiments are possible with the concepts of rotating the fiber optic connectors for polarity reversal.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation

BRIEF DESCRIPTION OF THE FIGURES

FIG. 11 is a perspective view of the boot of the duplex connector assembly of FIG. 3;

FIG. 26 is a schematic representation of a cross-sectional view of the optical waveguide fiber of FIG. 25.

DESCRIPTION

Figure 1:
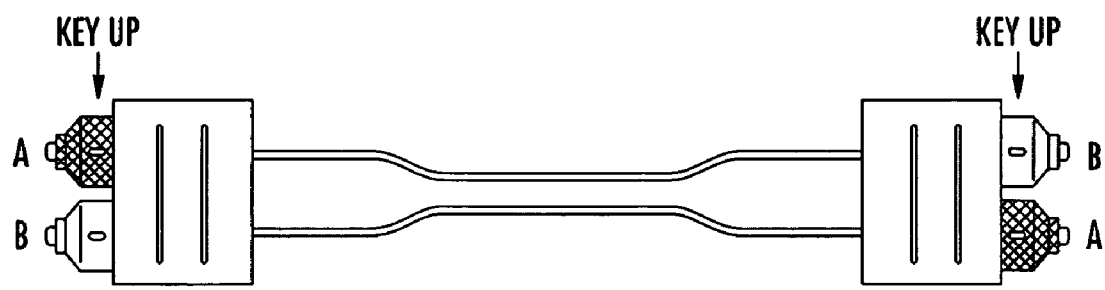
FIG. 1 is a schematic representation of a standard A-B duplex jumper cable polarity configuration as known in the art.

Reference is now made in detail to the present preferred embodiments of the disclosure, examples of which are illustrated in the accompanying drawings. Whenever possible, the same or similar reference numerals are used throughout the drawings to refer to the same or similar parts. It should be understood that the embodiments disclosed herein are merely examples, each incorporating certain benefits of the present disclosure. Various modifications and alterations may be made to the following examples within the scope of the present invention, and aspects of the different examples may be mixed in different ways to achieve yet further examples. Accordingly, the true scope of the invention is to be understood from the entirety of the present disclosure, in view of but not limited to the embodiments described herein.

Figure 2:
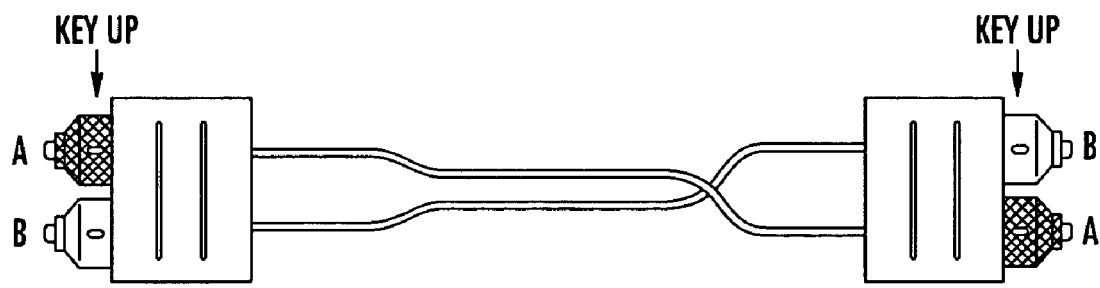
FIG. 2 is a schematic representation of a standard A-B duplex jumper cable polarity configuration as known in the art.

The disclosure relates to duplex fiber connector assemblies, duplex fiber optic cable assemblies, and methods therefor, whose polarity is reversible by the craft. FIG. 1 shows a typical A-to-B polarity configuration and FIG. 2 shows an A-to-A polarity configuration, which are both known in the art. In the past each polarity configuration was either fixed for each cable assembly or was reversible by manually disassembling the cable assembly and reassembling it in the desired polarity orientation. Duplex jumper cables were typically made from two conjoined simplex jumper cables, with the fiber optic connectors held together by means of a clip-like device to create the duplex. This construction required routing of two cables per cable assembly and resulted in crowding of patch panels, airflow issues, tangling of cables and the like.

Single cable duplex jumpers as known in the art greatly improved the issue of crowding and airflow, but sacrificed the ability to reverse polarity. The craft enjoyed the improved accessibility and airflow, but lost the ability to change polarity from A-to-B to A-to-A, or vice versa as the need arose. Conventional, single cable duplex jumpers could not be altered in the field to change polarity if required. Therefore, if the polarity of such a single cable duplex jumper was incorrect it would require replacement. If a polarity issue arose within another component in the data center, such as with a module or fiber optic cable harness, the inability to change polarity of the fiber optic cable assembly in the field required replacement of other components.

Figure 3:
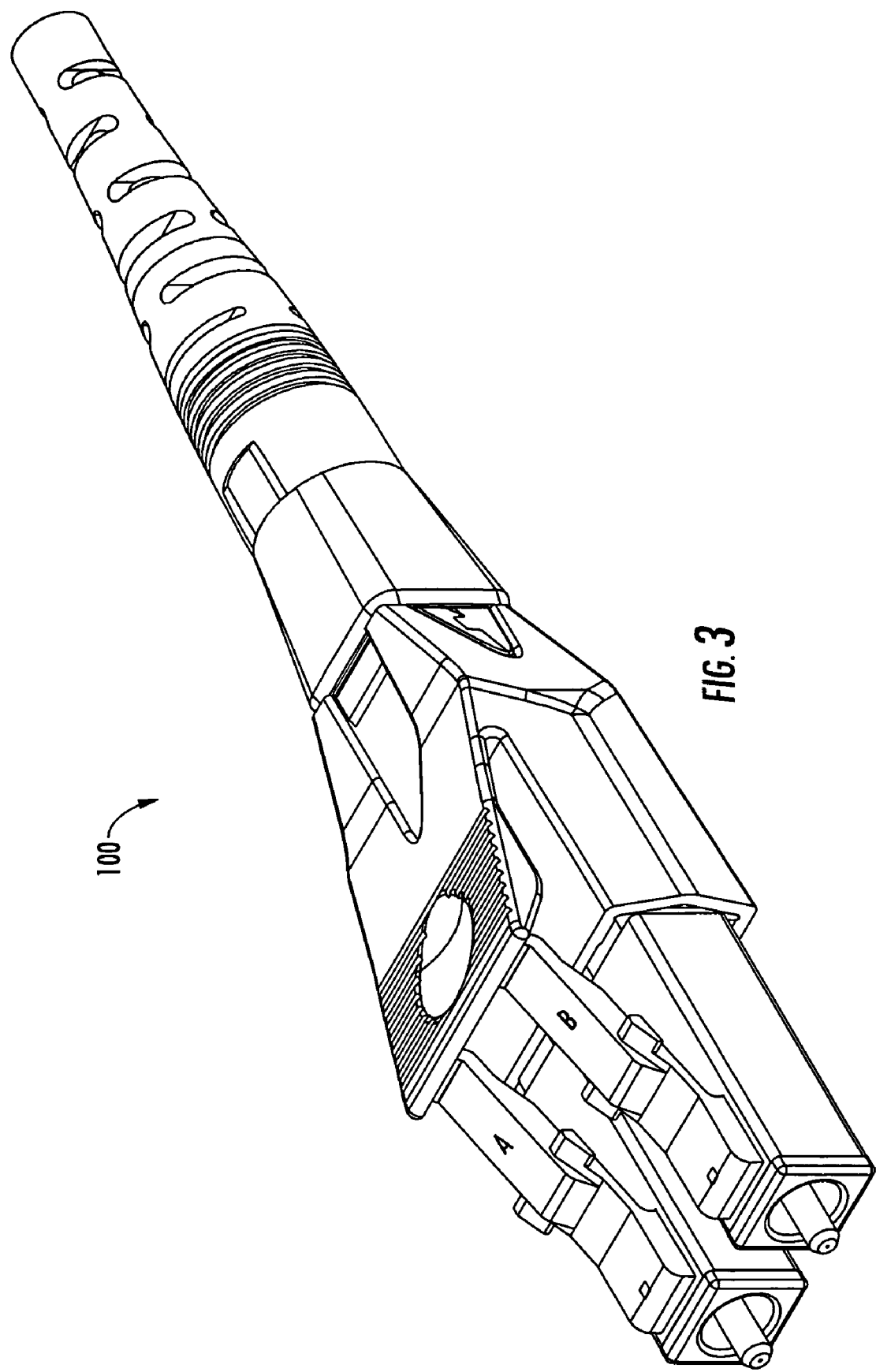
FIG. 3 shows a perspective view of an explanatory duplex connector assembly of the disclosure.
Figure 4:
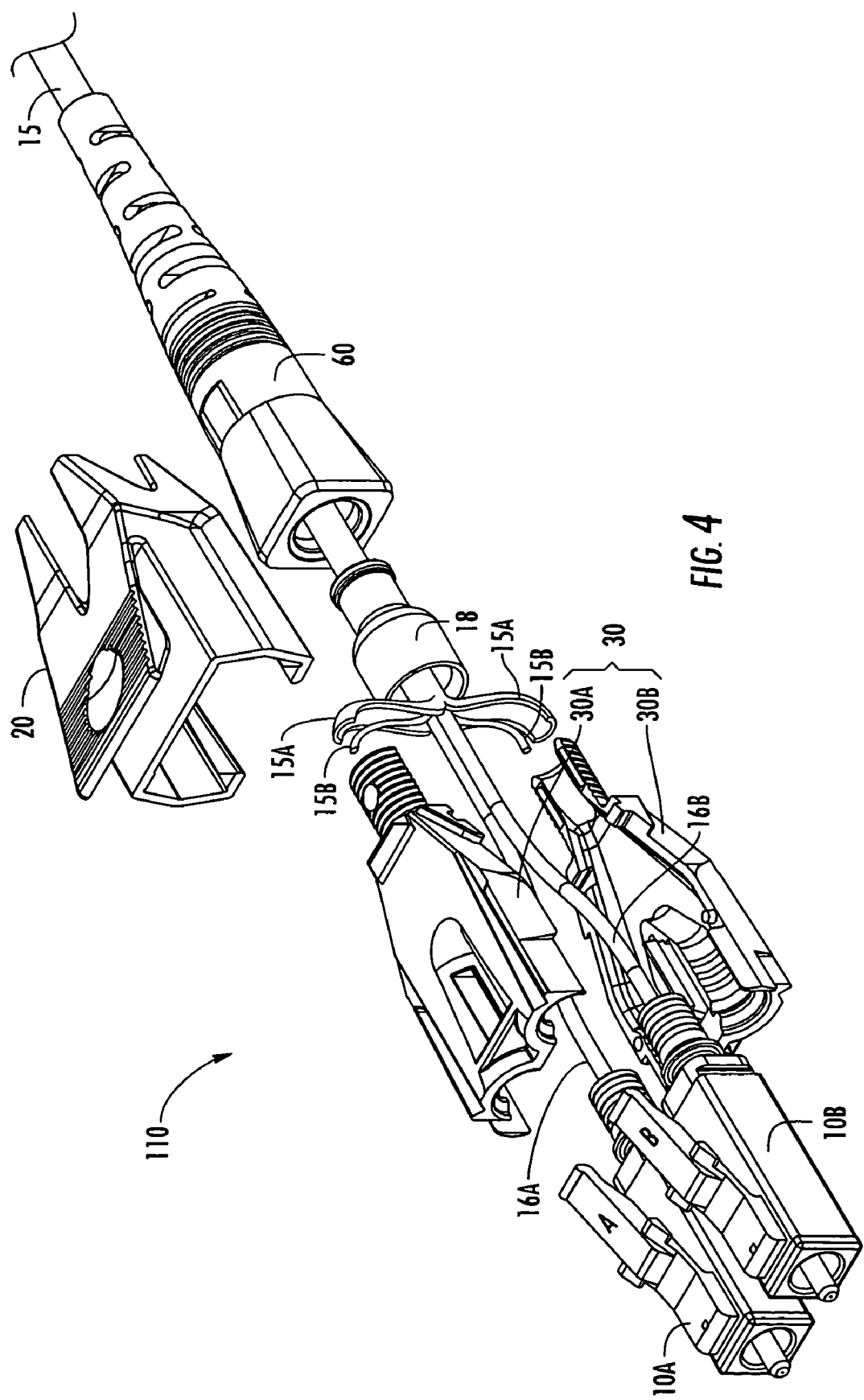
FIG. 4 shows a partially exploded view of the disclosed duplex connector assembly of FIG. 3.

FIG. 3 shows one explanatory embodiment of a duplex fiber optic connector assembly 100 suitable for in situ polarity reversal. FIG. 4 shows a partially exploded view of duplex fiber optic connector assembly 100 as a portion of a duplex fiber optic cable assembly 110. The duplex fiber optic cable assembly 110 includes a first fiber optic connector assembly 10A, a second fiber optic connector assembly 10B, a housing 30 for receiving the first and second fiber optic connector assemblies 10A and 10B. The first and second fiber optic connector assemblies 10A and 10B may independently rotate along their respective longitudinal axes for polarity reversal within housing 30. As shown, connector assemblies 10A and 10B are attached to optical fibers 16A and 16B issuing from a fiber optic cable 15. The fiber optic cable 15 may be any suitable fiber optic cable or cables. By way of example, the fiber optic cable may include two unbuffered optical fibers generally surrounded by one or more strength elements and a cable jacket: however, other variations of the fiber optic cable may include buffered optical fibers and/or eliminate the strength elements or jacket. In this embodiment, fiber optic cable 15 is secured to the housing 30 by a crimp band 18 and a boot 60 fits over a portion of fiber optic cable 15 and the crimp band 18 until it abuts the housing 30. Of course, other variations of the fiber optic connector are possible that allow independent rotation of the fiber optic connector assemblies within the housing. For instance, the fiber optic cable may have other crimp arrangements and/or use an epoxy or adhesive to secure the same to the fiber optic connector. In other embodiments, tubing may be positioned about optical fibers 16A and 16B within the housing 30, thereby providing bend control for inhibiting optical attenuation.

As depicted, a removable trigger mechanism 20 fits over the boot 60 and cable 15 and slides forward to engage the housing 30 and latch mechanisms on the respective first fiber optic connector assembly 10A and second fiber optic connector assembly 10B. The trigger mechanism 20 advantageously allows the craft to disengage both fiber optic connectors by pushing on a single trigger and also inhibits fiber optic cables from snagging on the connectors. The concepts disclosed herein may use any suitable simplex connector assembly for connector assemblies 10A and 10B, such as LC, SC, or other suitable configurations.

Figure 5:
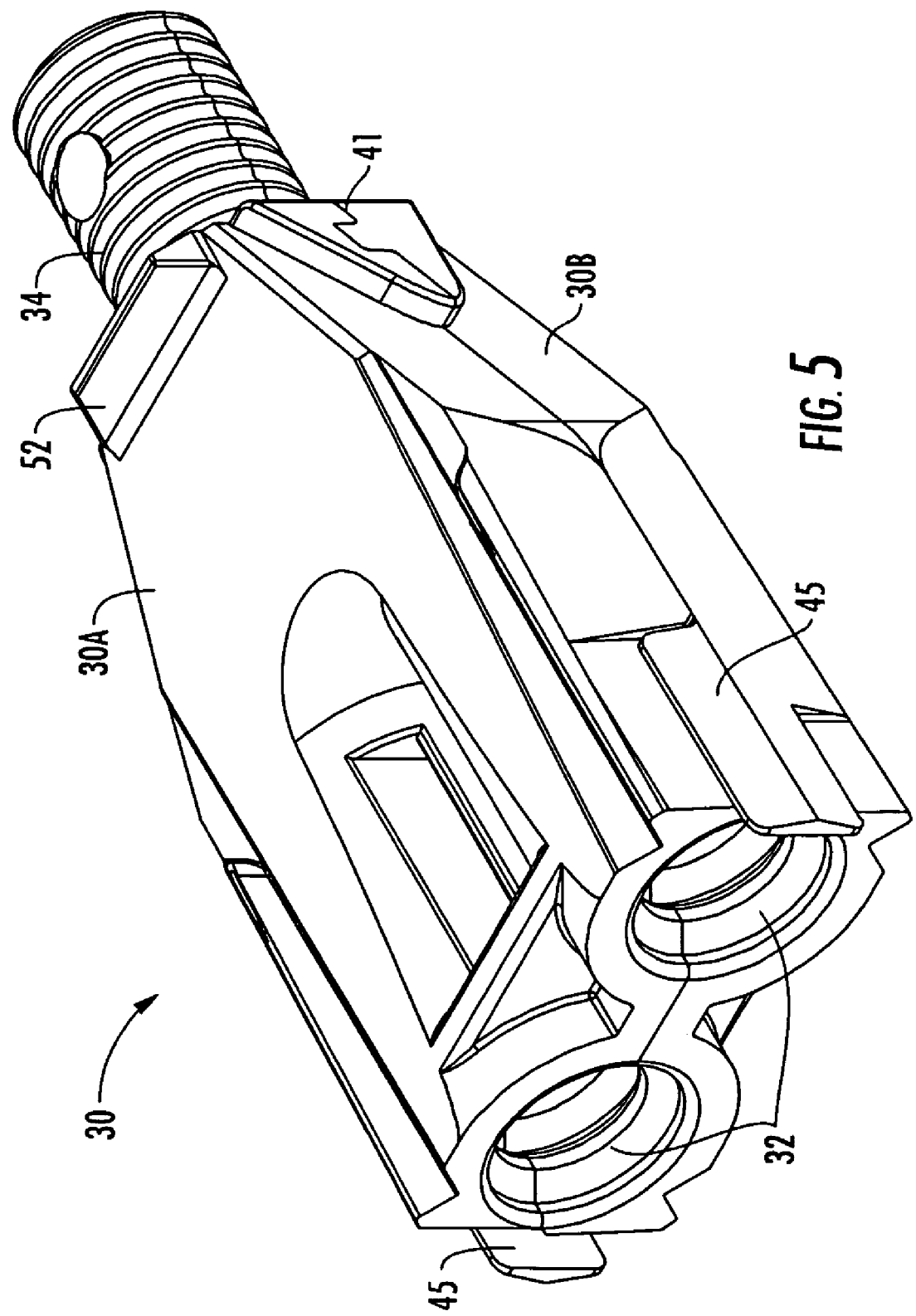
FIG. 5 is an embodiment of the housing wherein the housing is an assembly, comprising two components.
Figure 6:
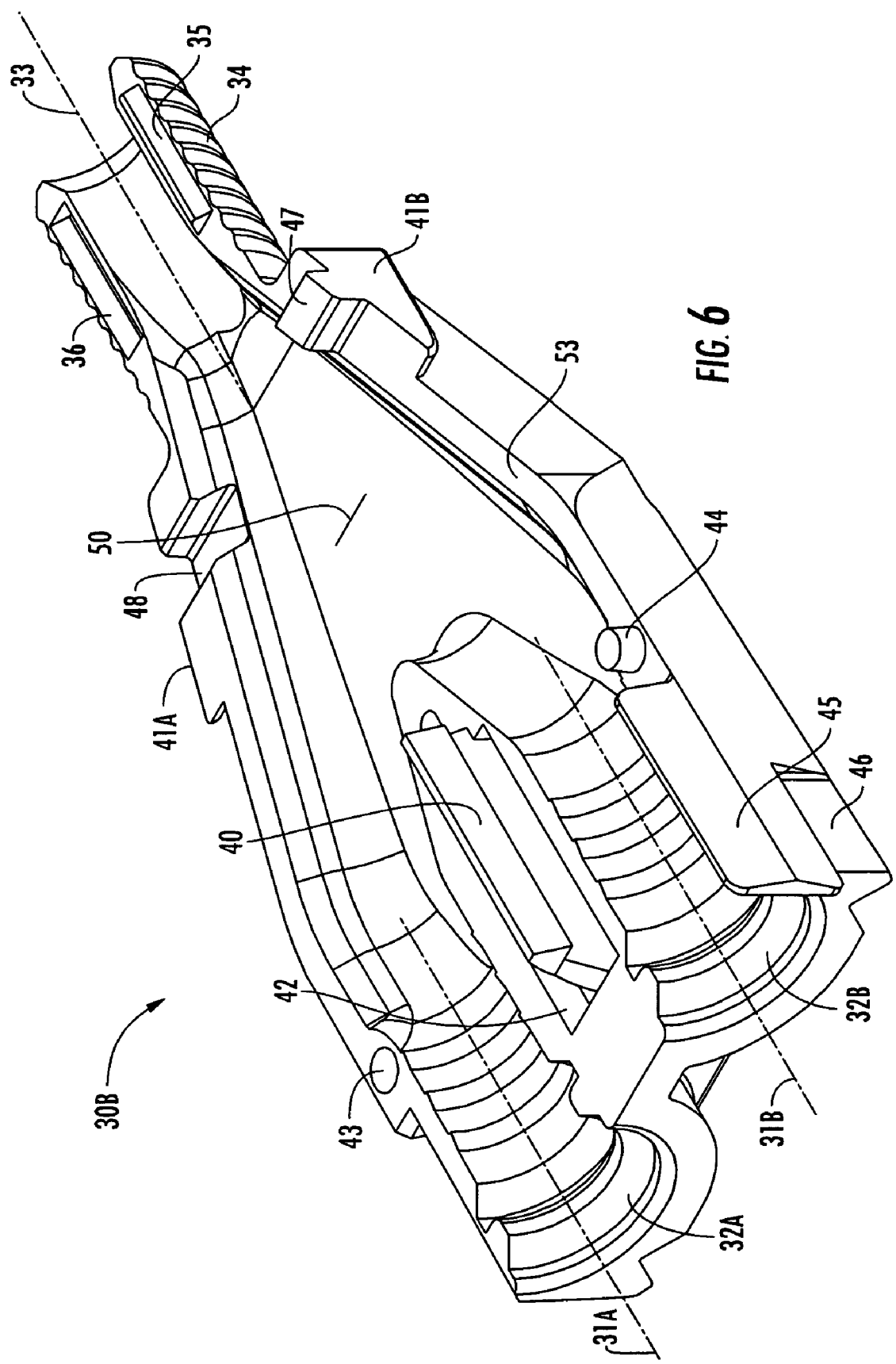
FIG. 6 is a perspective view of the inner portion of one component of the housing assembly of FIG. 5.
Figure 7:
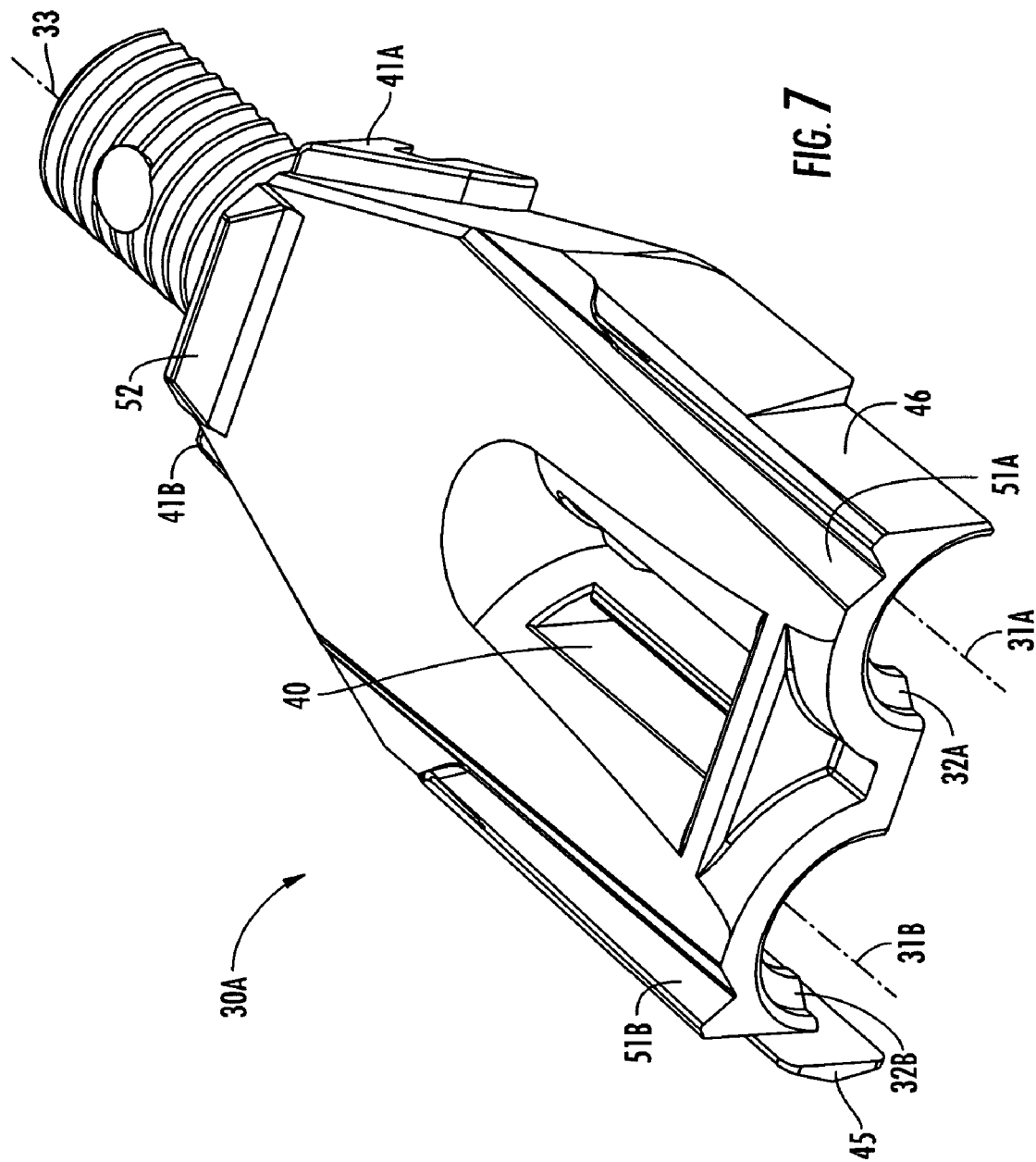
FIG. 7 is a perspective view of the outer portion of one component of the housing assembly of FIG. 5.

As shown in FIG. 5, the housing 30 comprises a first component 30A and a second component 30B that attach together and form apertures 32. FIGS. 6 and 7 show detailed views of one component of housing 30. In this embodiment, the first housing component 30A and second housing component 30B are substantially identical, but other embodiments can use housing components that are not identical. The first housing component 30A and the second housing component 30B abut along surface 53, found on each component, such that housing 30 comprises an assembly. Alignment protrusion features 35, 44 and 47 cooperate with corresponding alignment cavity features 36, 43 and 48, respectively, providing alignment and preventing lateral and axial translation. The alignment features are shown by way of example and in no way limit the possible configurations of such features. As best shown in FIG. 6, housing component 30B includes a latch 40 and a latch aperture 42. When the complementary housing components are attached together the latch 40 on one component and a latch aperture 42 on the other component cooperate to secure the two housing components together. In other embodiments housing components 30A and 30B may not be substantially identical, such as one half may comprise all the alignment cavity features 36, 43 and 48 and the other half comprise all the alignment protrusion features 35, 44 and 47. Likewise, other configurations are possible for securing the housing components together. Other variations include a housing formed from a single component that has an upper and lower portion connected by a living hinge.

FIG. 5 shows that housing 30 has two substantially parallel apertures 32 on a first end for receiving said first and second fiber optic connectors 10A and 10B, respectively. The two substantially parallel apertures 32 are formed at least partially from the intermating of first housing component 30A and second housing component 30B, wherein a first aperture feature 32A on one housing component, being arcuate and substantially semicircular, mates with a second aperture feature 32B on the other housing component to fully define one of the two substantially parallel apertures 32. First aperture feature 32A and second aperture feature 32B are configured to receive and retain a portion of the first 10A and second 10B connector assembly housing in such a manner as to allow rotation for polarity reversal. Rotation of the first and second connector assemblies 10A and 10B is generally about respective axes 31A and 31B, defined as the center of the arcuate surfaces of first 32A and second 32B aperture features on the first and second housing components 30A and 30B of housing 30. The proximity of first and second fiber optic connector assemblies 10A and 10B is such that rotation of each will be opposite each other for polarity reversal. As shown in FIG. 6, latch 40 and latch aperture 42 are located substantially between first aperture feature 32A and second aperture feature 32B, but other orientations are possible. Housing components 30A and 30B can be injection molded using a suitable thermoplastic or thermoset polymer. By way of example, one suitable polymer is a glass filled polyetherimide such as glass filled ULTEM® commercially available from Sabic Innovative Plastics.

Housing 30 further has a crimp body 34, defining an axis 33, on the opposite side from the two substantially parallel apertures 32 that is at least partially defined from the mating of the first and second components 30A and 30B. The crimp body 34 is in continuous communication with the two substantially parallel apertures 32 by housing through passage 50. Crimp body 34 is configured to interact with fiber optic cable 15 and crimp band 18 to allow ingress of optical fibers 16A and 16B through its passage and for securing the fiber optic cable 15 to the housing 30 at the outer periphery. Fiber optic cable 15 enters the housing components 30A and 30B and its optical fibers 16A and 16B are respectively attached to each fiber optic connector assembly 10A and 10B. Fiber optic connector assemblies 10A and 10B may receive suitably prepared optical fibers and fiber optic cable 15 can have any suitable type of optical fibers such as unbuffered 250 micron optical fibers 16A and 16B. Moreover, the optical fibers of fiber optic cable 15 may be any suitable type of optical fibers such as multimode, single-mode, etc. Crimp band 18 provides further clamping to the housing components and secures the fiber optic cable 15 to housing 30 by capturing one or more strength elements 15B and possibly the cable jacket 15A. Housing components 30A and 30B may also include respective ridges 52 that provide additional grip for the craft to pull the duplex connector cable assembly 100 from a crowded patch panel.

Housing 30 also includes resilient member 45 on each housing component 30A and 30B. When housing 30 is assembled the resilient members 45 are opposite each other along and generally perpendicular to a plane through axes 31A and 31B. Each housing component 30A and 30B has resilient member back stops 46, located on each side such that when the two housing components are mated the resilient members 45 are prevented from over-flexing inward. Resilient member 45 acts as a detent to the rotation of the respective fiber optic connector assembly 10A or 10B, and may provide a tactile and/or audible feedback to the craft during rotation. In other words, the craft may feel when passing the center point of rotation and/or hear an audible click when rotating a fiber optic connector assembly from a first position to a second position. In this embodiment, resilient members 45 are cantilevered leaf springs; however, the resilient members 45 can have other suitable configurations. As shown, each resilient member 45 is integral to housing component 30A or 30B, though its function could be performed by discrete resilient members in other embodiments, e.g., metal or plastic removable clips that serve as detents. Other variations may use a single resilient member as a detent for both fiber optic connector assemblies 10A and 10B. Other variations of the housing may have a crimp body that is formed by a single component of the housing; rather, than from two components. Still further, the housing may comprise a one-piece structure such as two portions connected by a living hinge that close about the fiber optic connector assemblies.

Figure 8:
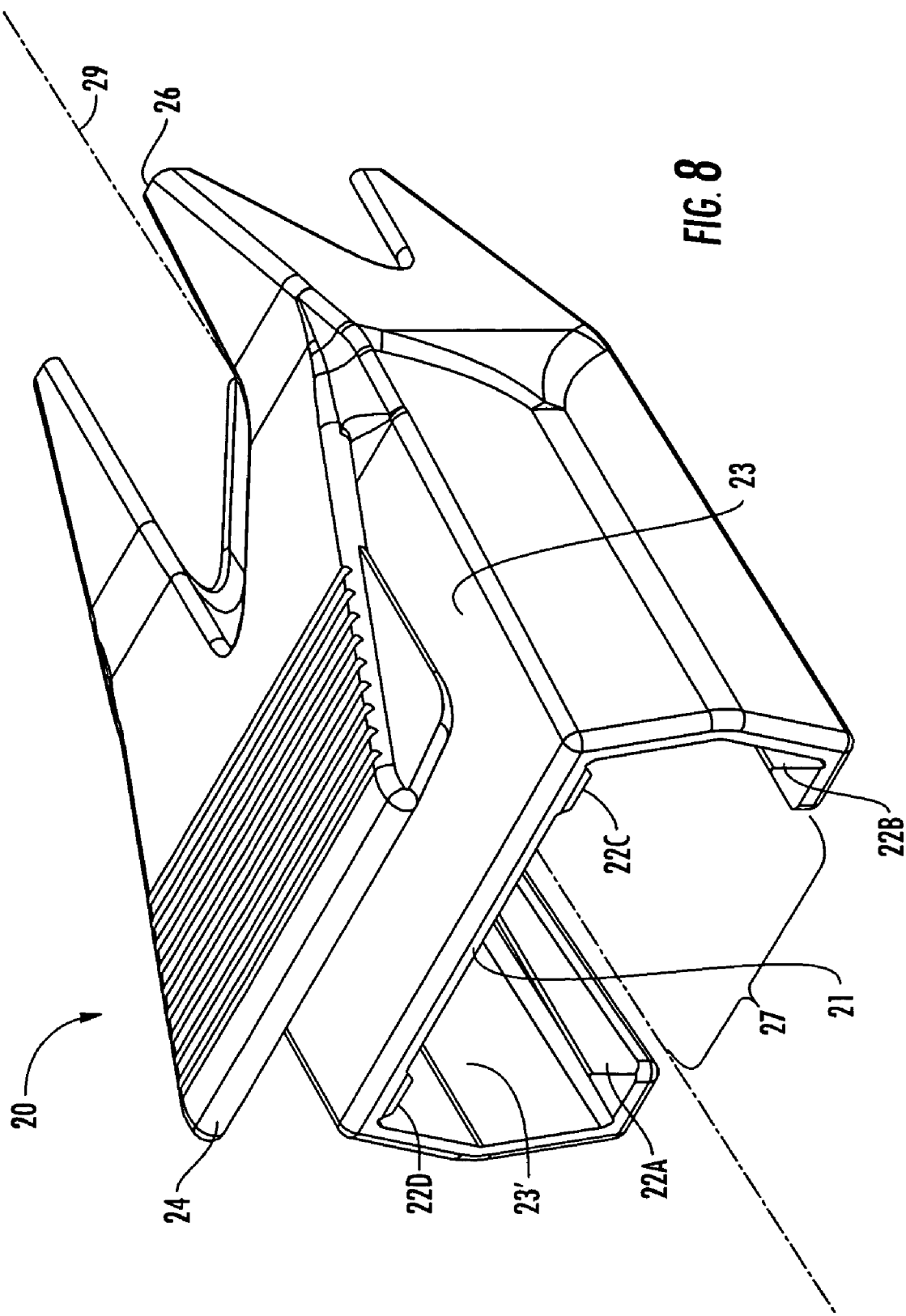
FIG. 8 is a perspective view of the trigger mechanism of the duplex connector assembly of FIG. 3.
Figure 9:
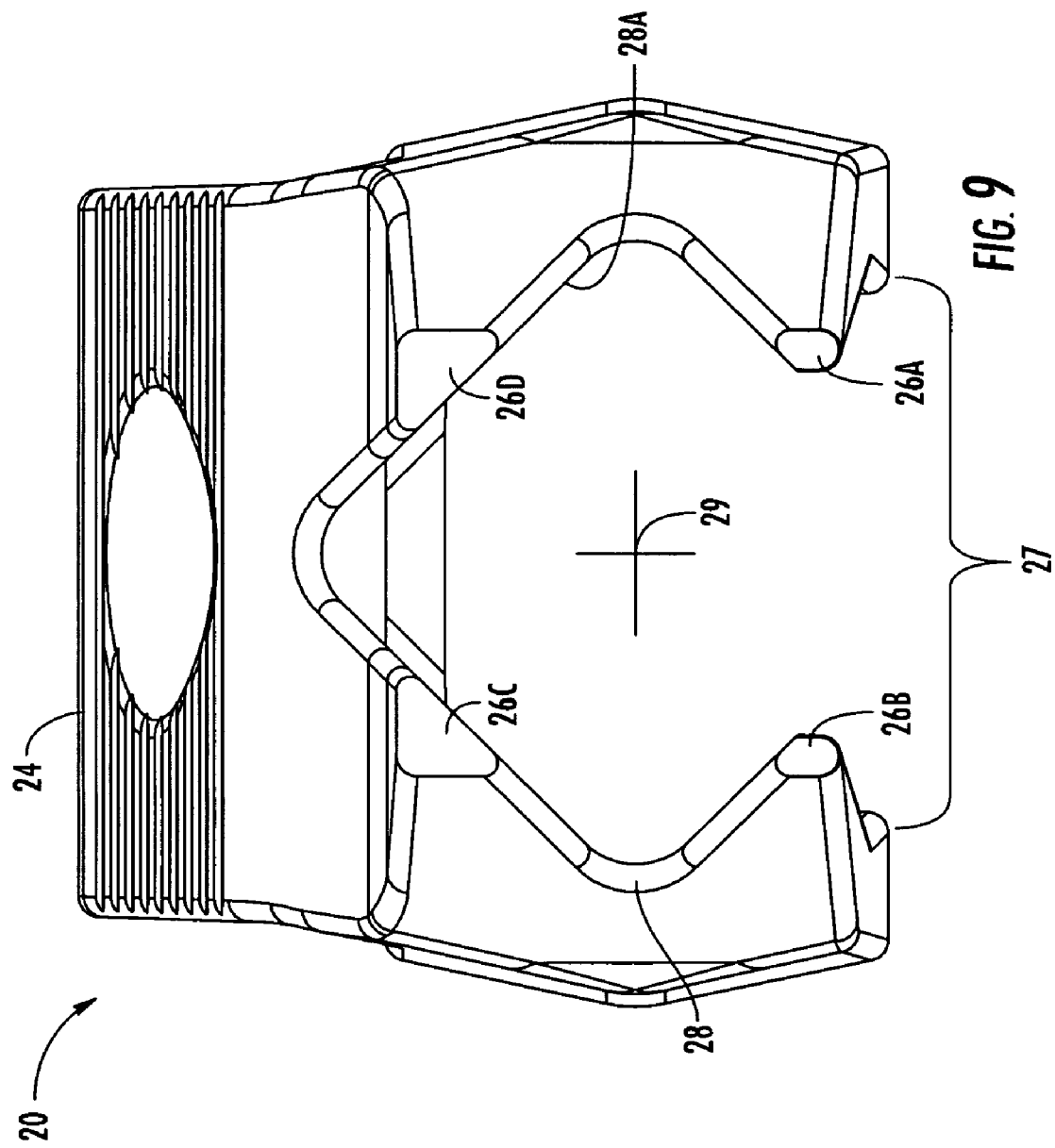
FIG. 9 is a rear view of the trigger mechanism of FIG. 8.
Figure 10:
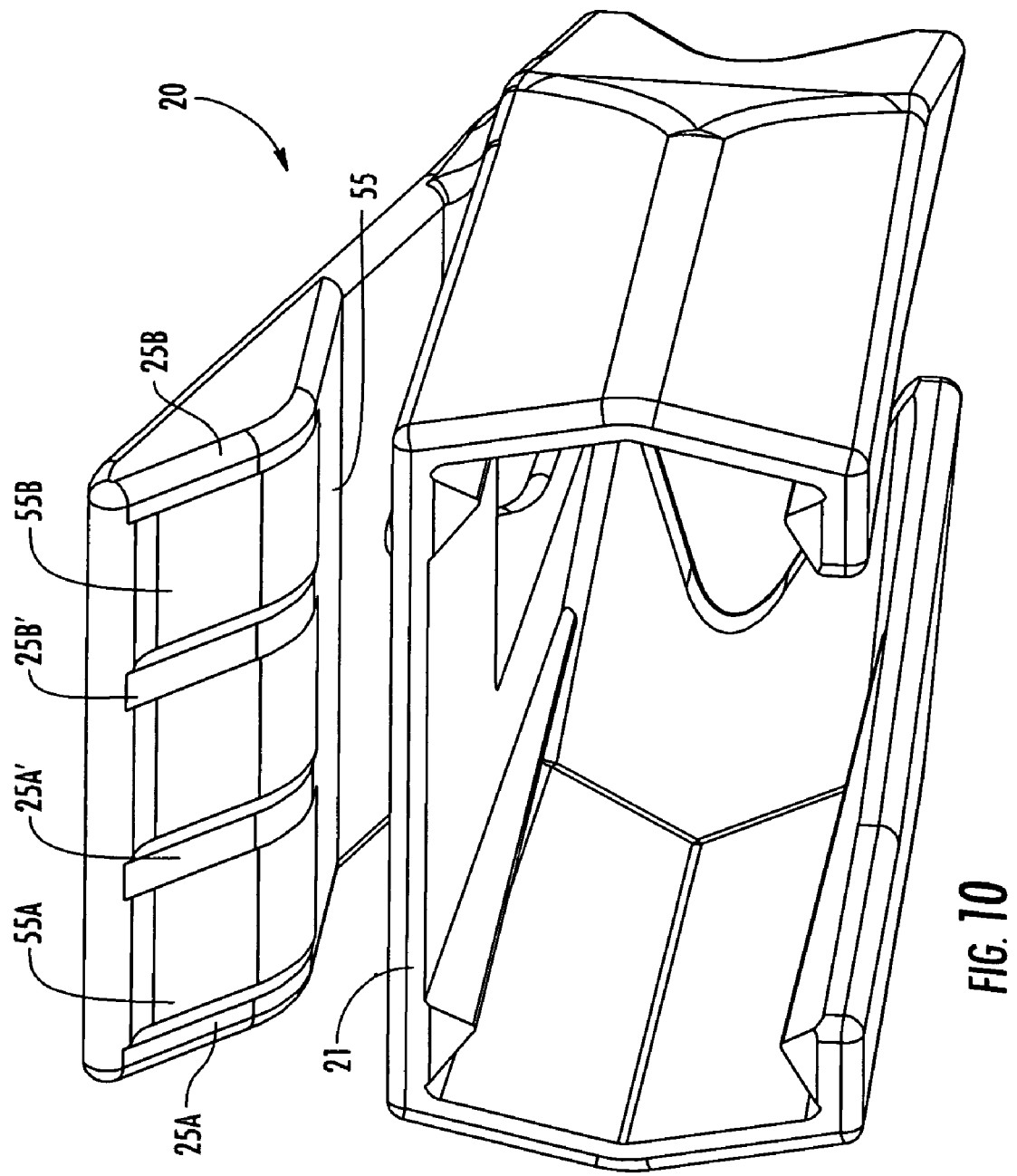
FIG. 10 is an oblique front view of the trigger mechanism of FIG. 8.
Figure 77:
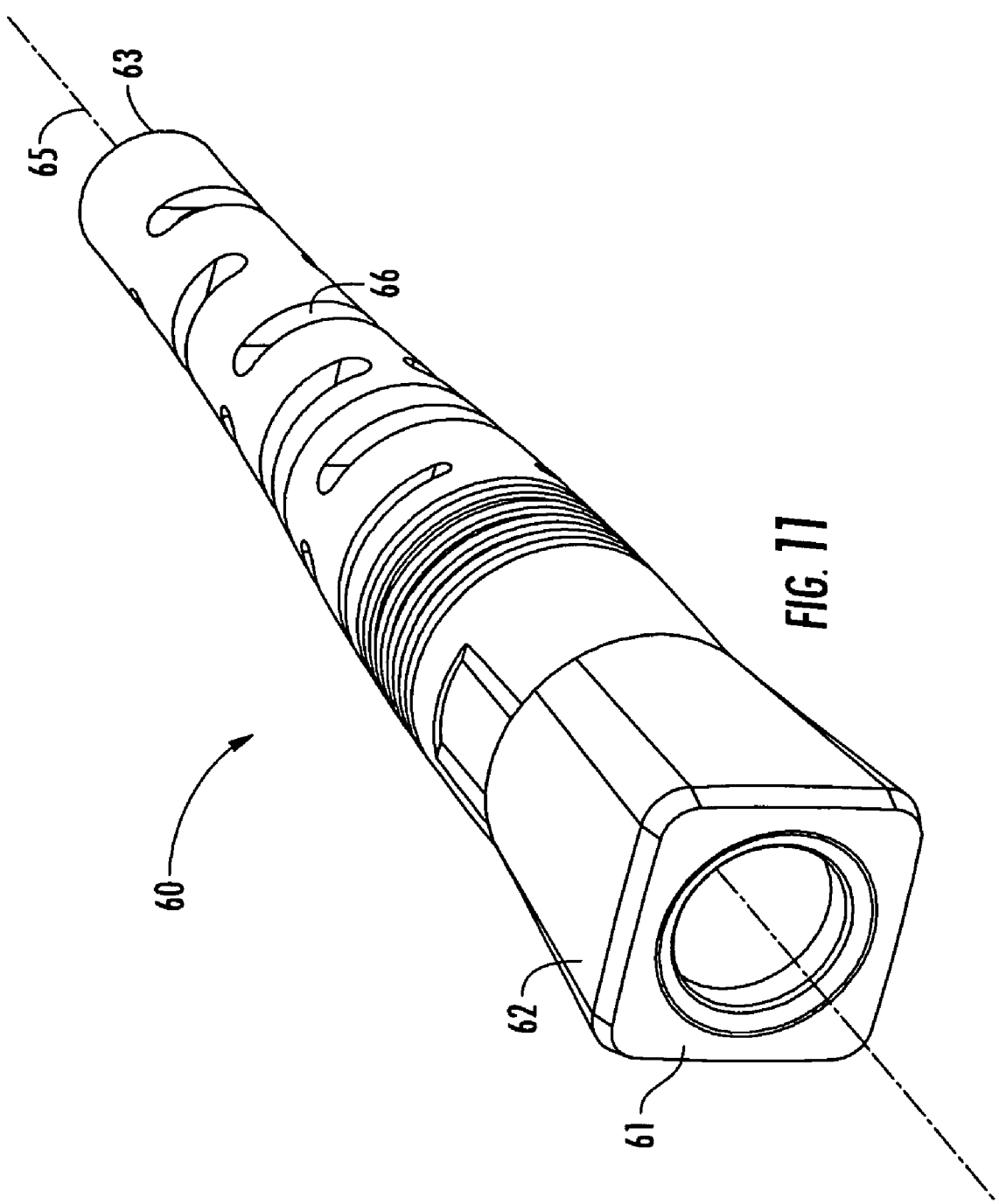

FIGS. 8-10 show the details of trigger mechanism 20. Trigger mechanism 20 has a substantially rectangular shell 23 with a substantially rectangular through passage defining axis 29. Trigger mechanism also has a front 21, a back 26 opposite the front 21, a flexible arm 24 attached to the shell 23 and extending angularly away from it, a lateral opening 27 in the shell 23 opposite the flexible arm 24 for receiving fiber optic cable 15, and sidewalls 23'. Trigger mechanism 20 can be injection molded from any suitable thermoplastic or thermoset polymer such as ULTEM® that is commercially available.

Features of trigger mechanism 20 may interact with features on housing 30. For instance, retention feature 41 on the housing 30 (FIG. 5) interacts with a surface 28 (FIG. 9) on trigger mechanism 20. Specifically, retention feature 41 comprises partial retention features 41A and 41B on the first and second housing components 30A and 30B, whereby retention feature 41 is fully formed upon the mating of the two housing components. Thus, when the trigger mechanism 20 is fully seated on housing 30, the trigger mechanism requires deliberate action for removing the same. Surface 28 on trigger mechanism 20 is at least partially formed from aperture 28A, which is coaxial with axis 29. Aperture 28A is rectangular when viewed axially, and more specifically substantially a rhomboid shape to allow passage over proximal end 62 of boot 60, seen in more detail in FIG. 11, when boot 60 has been rotated at least about 45 degrees.

Trigger mechanism 20 may also include one or more longitudinal alignment features that cooperate with one or more corresponding longitudinal alignments features on housing 30. As shown, trigger mechanism 20 and housing 30 have a plurality of longitudinal alignment features 22A-D and 51A-D that are respectively quadrilaterally arranged for permitting the trigger mechanism 20 to slidably engage the housing 30; however, other arrangements are possible. Additionally, the trigger mechanism 20 further clamps housing components 30A and 30B and nestles the latch arms found on fiber optic connector assemblies 10A and 10B into cavities 55A and 55B (FIG. 10) underneath flexible arm 24. Cavity 55A is defined by partitions 25A and 25A'. Likewise, cavity 55B is defined by partitions 25B and 25B'. Both cavities 55A and 55B share a common profile, defined by flexible arm cam surface 55. Protection from inadvertent rotation of the fiber optic connector assemblies 10A and 10B is achieved by cavities 55A-B and sidewalls 23'. Simply stated, the fiber optic connector assemblies are inhibited from rotating since the latch arms of the same are disposed in the cavities 55A and 55B of the trigger mechanism 20 and the sidewalls 23' of the trigger mechanism 20 inhibit the resilient elements 45 from being pushed outward.

FIG. 11 shows boot 60 having a proximal end 62 with a substantially flat proximal surface 61 and a distal end 63. The proximal end 62 may have a substantially rectangular shaped cross section, and more preferably substantially square shaped cross section and the distal end 63 may have a substantially circular cross section. The substantially flat proximal surface 61 is generally perpendicular to longitudinal axis 65 of boot 60 and when assembled and abuts back surfaces 26A-D on trigger mechanism 20 and ridge 52 on housing 30. Slots 66 provide controlled bending for fiber optic cable 15 of the duplex fiber optic connector cable assembly 110. Boot 60 is rotatably attached to duplex fiber optic connector cable assembly 110. More specifically, boot 60 is able to be rotated at least about 45 degrees in both directions, thereby allowing removal of the trigger mechanism 20 for polarity reversal.

Figure 12:
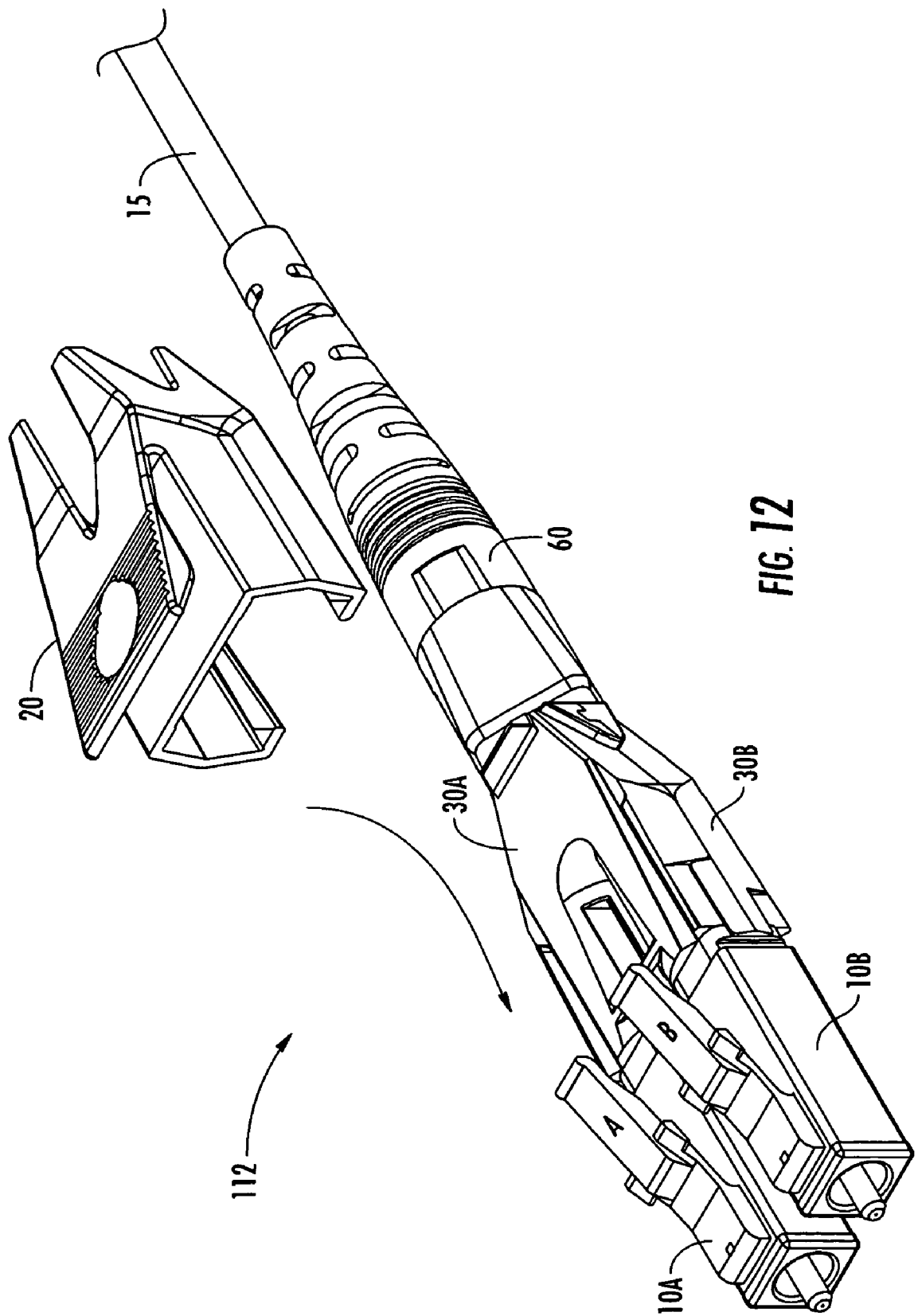
FIGS. 12-13 show a partially assembled perspective views of the duplex connector assembly of FIG. 3 receiving the trigger mechanism of FIG. 8.
Figure 13:
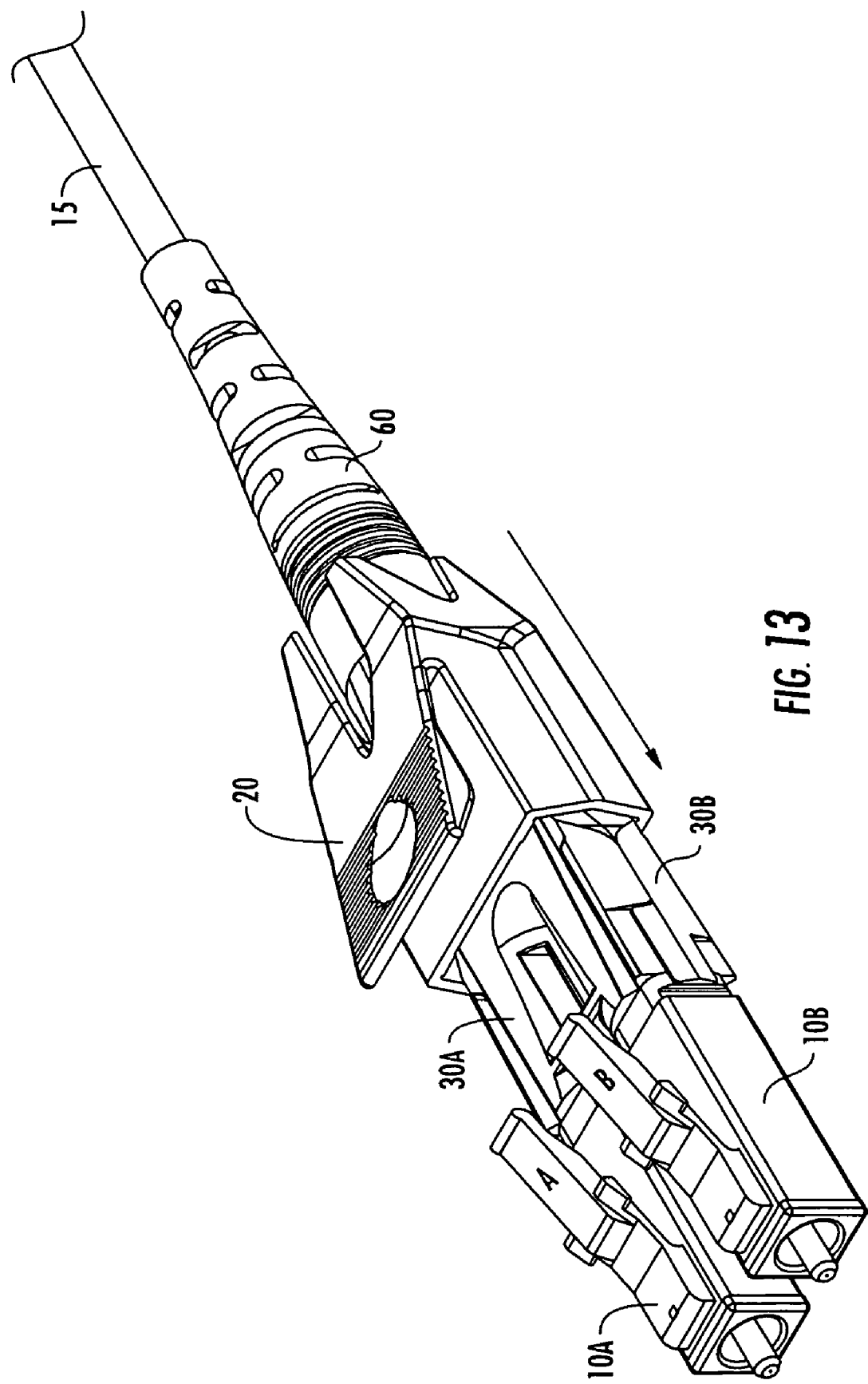
Figure 14:
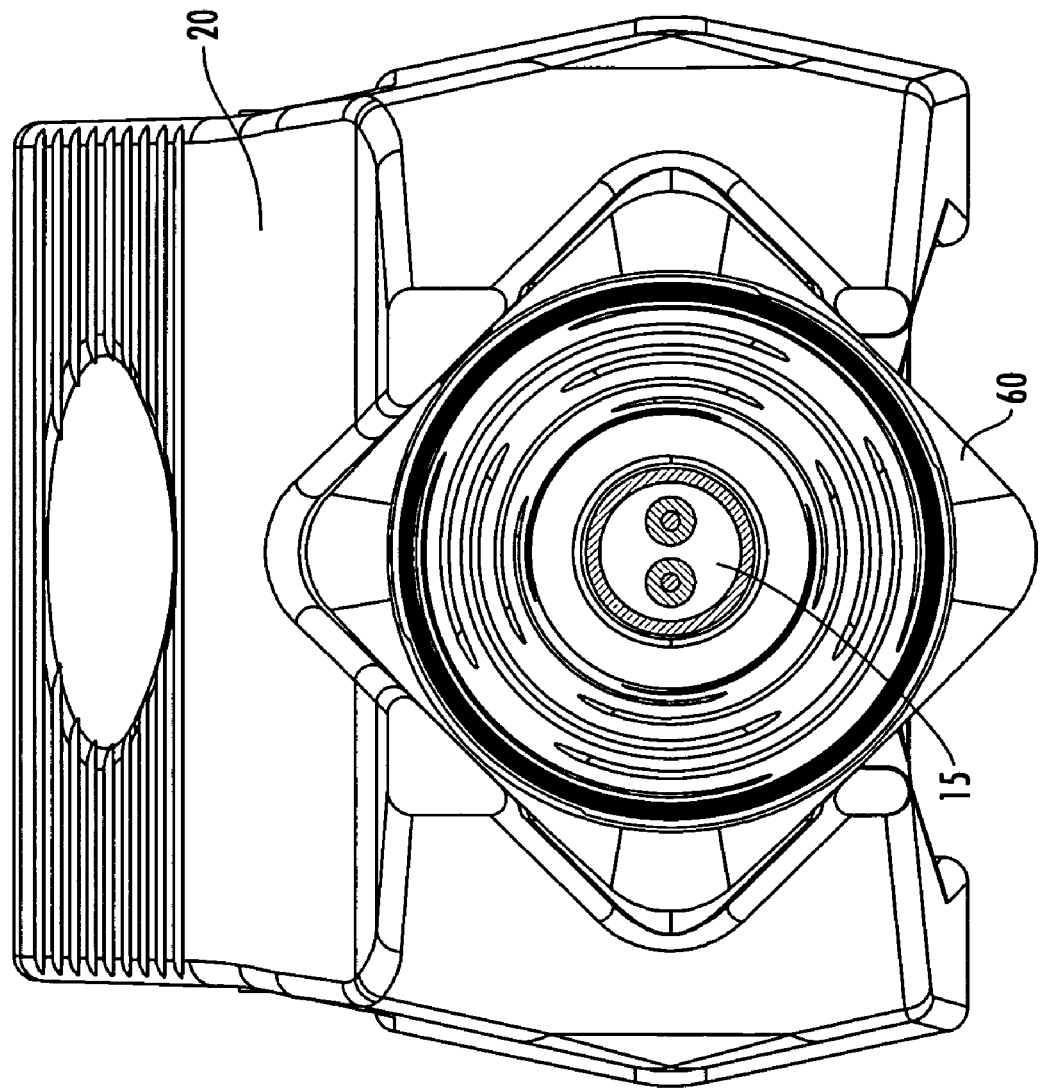
FIG. 14 shows a rear axial view of a partially assembled duplex connector assembly after trigger installation but prior to boot rotation.
Figure 15:
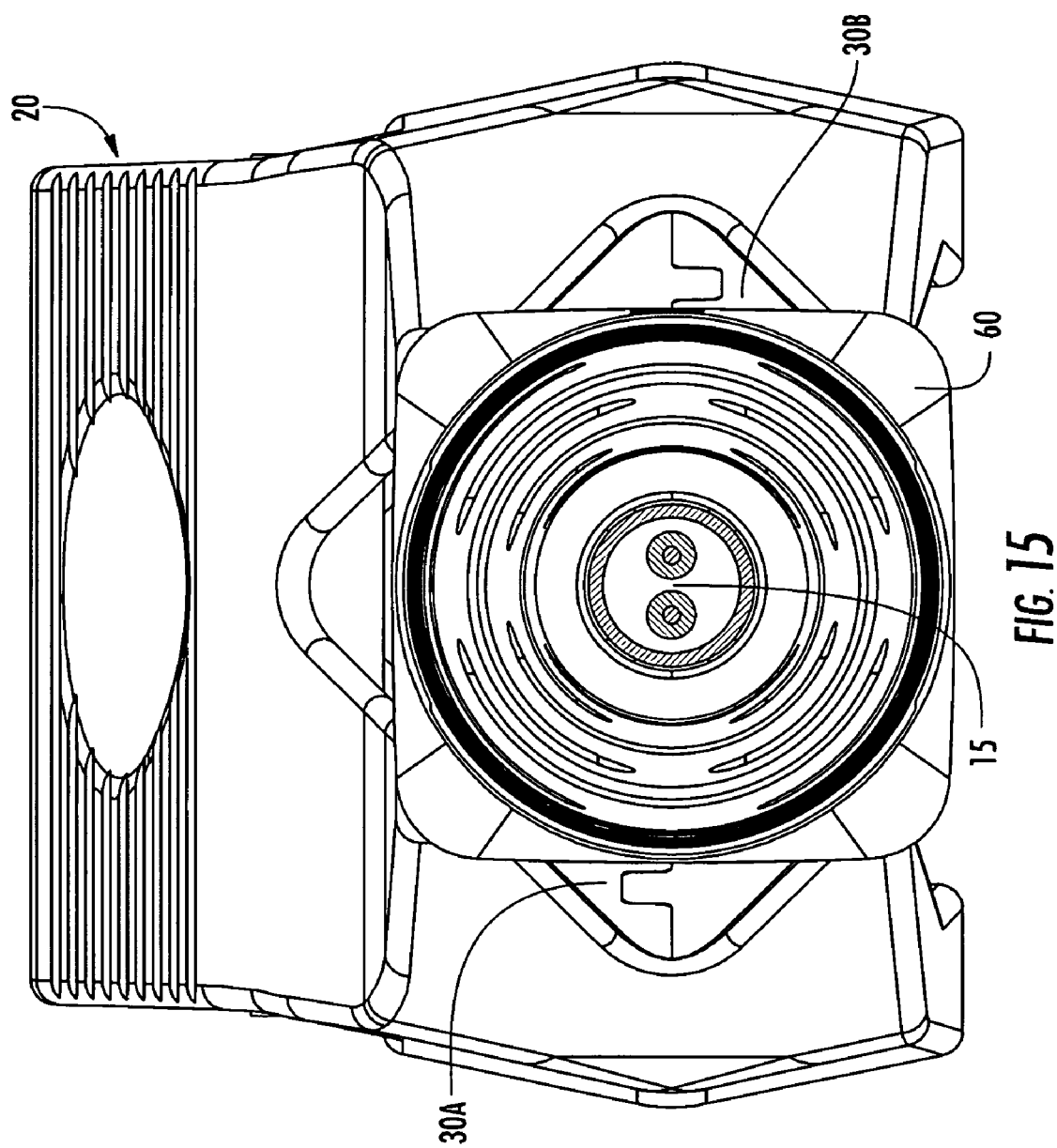
FIG. 15 shows a rear axial view of the duplex connector assembly after trigger installation after boot rotation.
Figure 16:
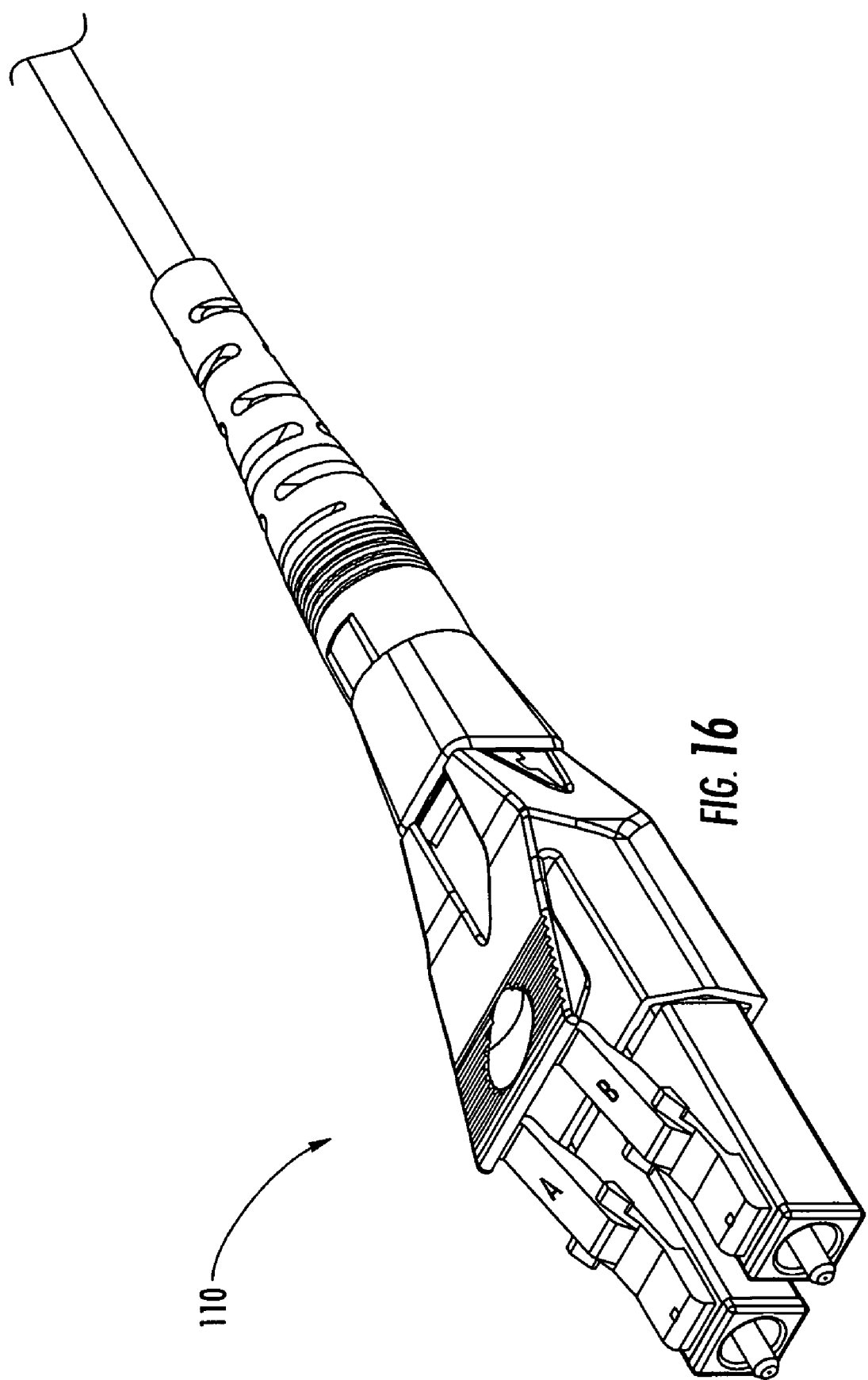
FIG. 16 is the duplex fiber optic cable assembly of the disclosure in a first polarity configuration.

FIGS. 12-23 depict an explanatory method of polarity reversal accomplished by rotating the first and second fiber optic connectors within the housing. For convenience and clarity fiber optic connector assemblies 10A and 10B are labeled with "A" and "B" to indicate a beginning polarity orientation. FIG. 12 shows a partially assembled duplex fiber optic connector cable assembly 112 with trigger mechanism 20 removed and boot 60 rotated about 45 degrees from a normally assembled position. Boot 60 is rotated about 45 degrees from an assembled position so that it is generally aligned (FIG. 14) with aperture 28A of the trigger mechanism 20. The curved arrow indicates the general direction for installation of the trigger mechanism 20 and the other direction allows removal. While predominately over fiber optic cable 15, trigger mechanism 20 is moved to bring through passage axis 29 of trigger mechanism 20 into relative coaxial alignment with crimp body 34, then translated axially (FIG. 13) over boot 60, and onto housing 30, slidably engaging housing longitudinal alignment features 51A-D with trigger mechanism longitudinal alignment features 22A-D until flexible arm 24 nests over the latch mechanisms of fiber optic connector assemblies 10A and 10B. Thereafter, boot 60 is rotated 45 degrees as shown in FIGS. 15 and 16 to the home (i.e., assembled position).

Figure 17:
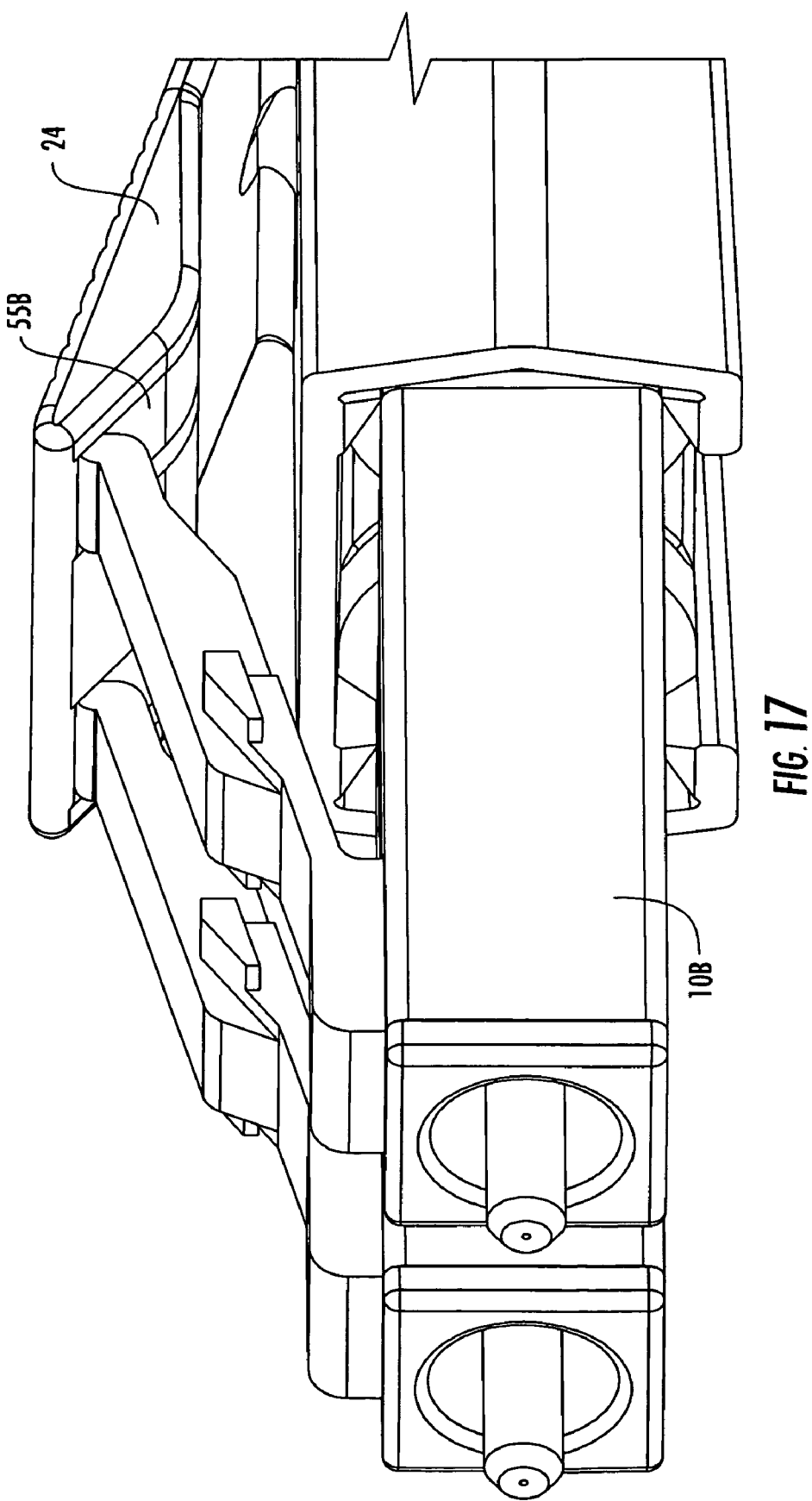
FIG. 17 is a detailed view of FIG. 16 showing the fiber optic connector latches interfacing with trigger mechanism.

Simply stated, FIG. 14 shows a rear axial view of boot 60 in a position that allows installation and/or removal of the trigger mechanism 20 and FIG. 15 shows boot 60 in its home position. Rear surfaces 26A-D of trigger mechanism 20 (FIG. 9) are exposed for removing boot 60 and rotation of boot 60 to the home position covers the same. This serves as a deterrent, along with retention features 41, to unintentional axial translation of the trigger mechanism 20 in the rearward direction. FIG. 17 is a detailed view of the nesting of the latch mechanisms of fiber optic connector assemblies 10A and 10B into cavities 55A and 55B, resisting rotation of the connector assemblies when the fiber optic connector is fully assembled. Trigger mechanism 20 also further resists connector assembly rotation in at least two additional ways. First, the trigger mechanism 20 inhibits resilient member 45 to flex outward by the presence of sidewalls 23' adjacent to resilient member 45. Second, trigger mechanism 20 clamps the first 32A and second 32B aperture features of the connector housing together so that longitudinal alignment features 22A-D interacting with housing longitudinal alignment features 51A-D, thereby inhibiting unintended rotation of the fiber optic connector assemblies. FIG. 16 shows duplex fiber optic cable assembly 110 in a first polarity configuration. The polarity of the assembly may be changed to a second polarity configuration (FIG. 24) by rotating the boot, removing the trigger mechanism, rotating the fiber optic connectors in opposite directions and replacing the trigger mechanism on the other side of the connector housing, and then rotating the boot to a home position.

Figure 18:
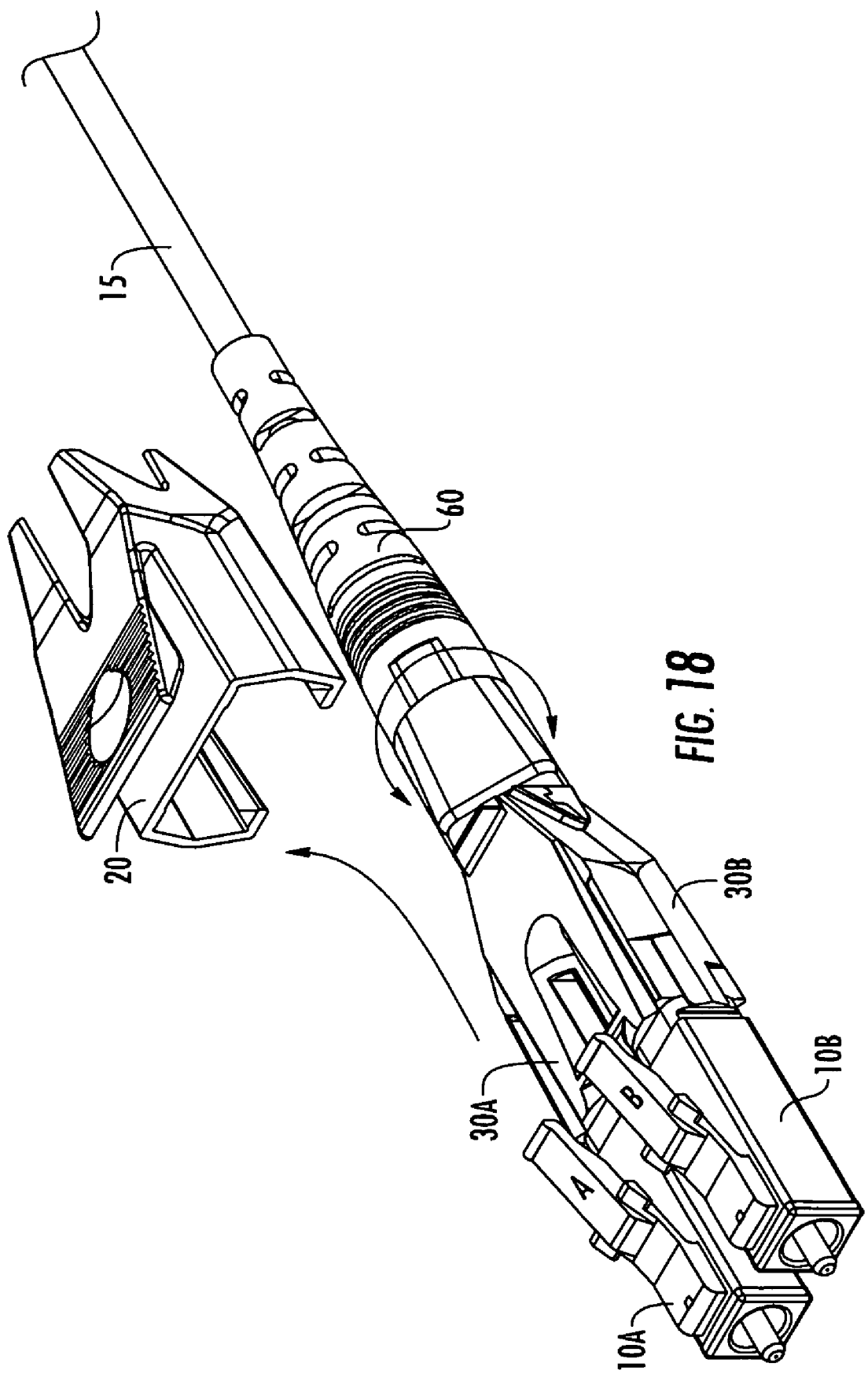
FIG. 18 shows a perspective view of the duplex connector assembly beginning the polarity reversal procedure by having the boot rotated so that the trigger mechanism may be removed.
Figure 19:
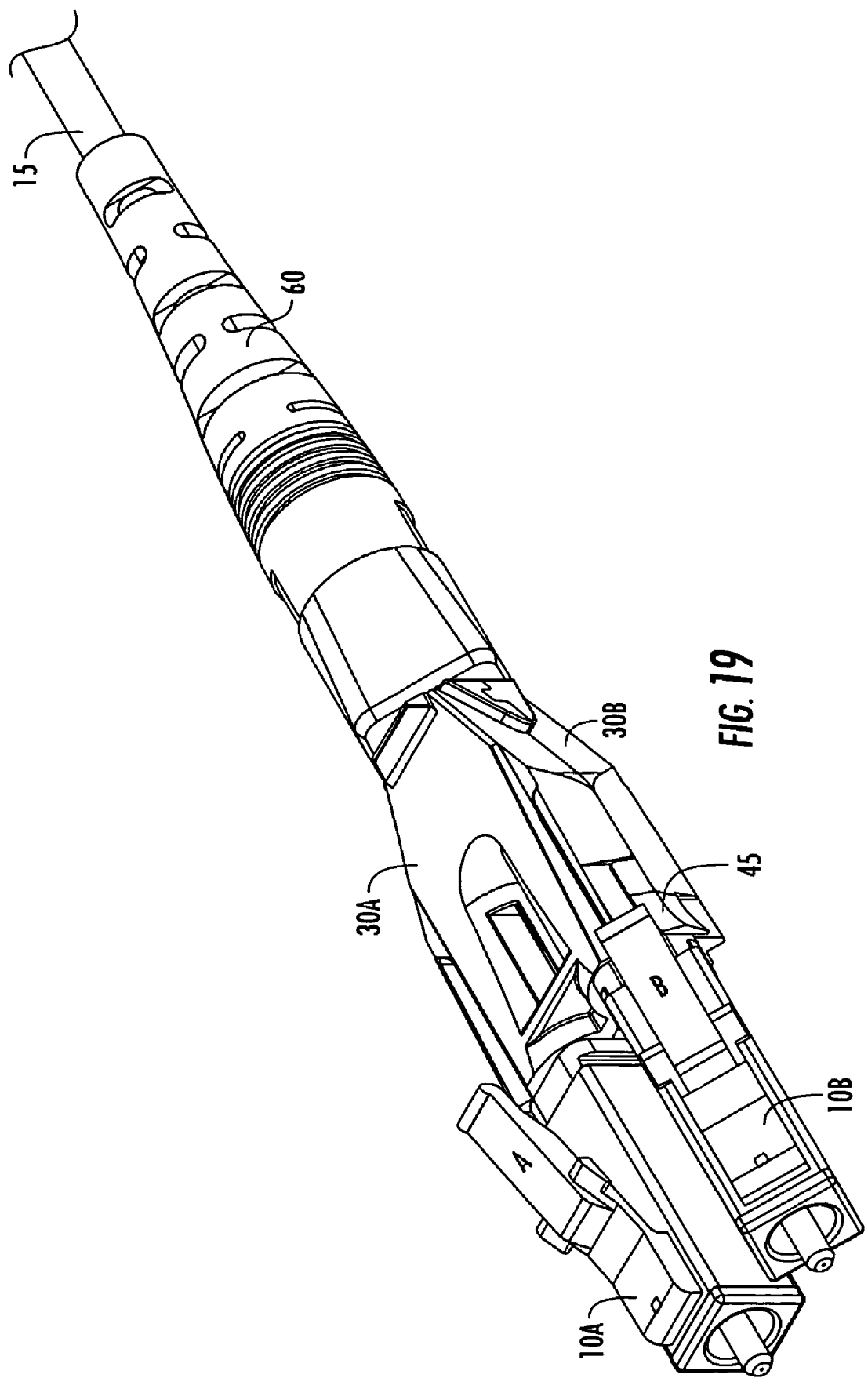
FIG. 19 shows a perspective view of the duplex connector assembly of FIG. 18 during the polarity reversal procedure after the trigger mechanism is completely removed and one of the fiber optic connector assemblies is partially rotated within the housing.
Figure 20:
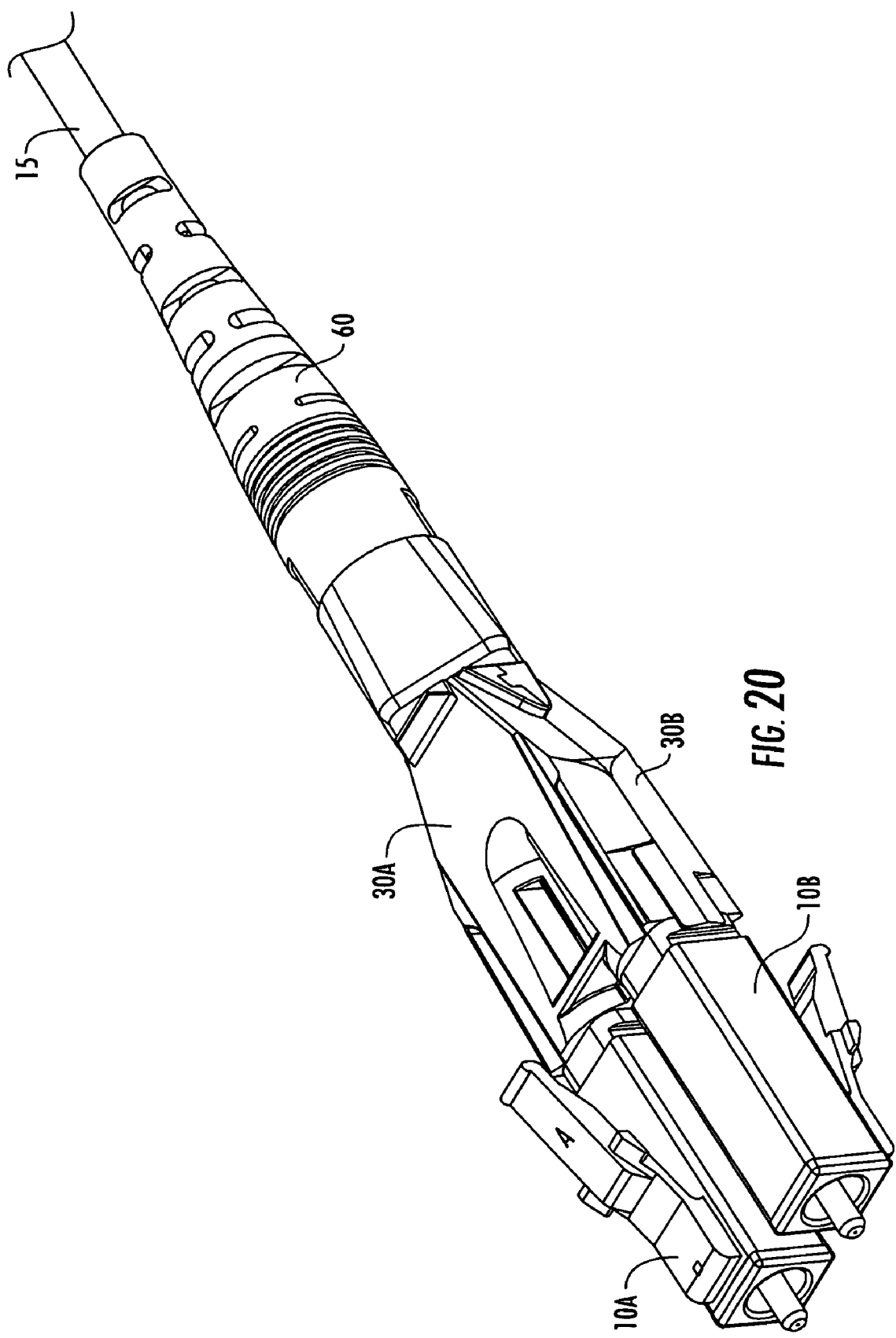
FIG. 20 shows the polarity reversal procedure of FIG. 19 after one of the fiber optic connector assemblies is fully rotated during the polarity reversal procedure.

FIG. 18 shows the removal of trigger mechanism 20, which is the reverse of FIG. 12 for installing the trigger mechanism 20. Specifically, boot 60 is rotated about 45 degrees from its home position and trigger mechanism 20 is translated axially along housing alignment features 51A-D, over retention features 41, over boot 60 and fiber optic cable 15 until finally lifted off of the assembly via lateral opening 27. Thereafter, fiber optic connector assembly 10B may begin its rotation as shown in FIG. 19. As shown in FIG. 19, resilient member 45 flexes outward during rotation of fiber optic connector assembly 10B, thereby allowing the corner of the connector housing to pass. Rotation is continued for about 180 degrees until fiber optic connector assembly 10B is in the position shown in FIG. 20. At this point fiber optic connector assemblies 10A and 10B are 180 degrees opposite each other.

Figure 21:
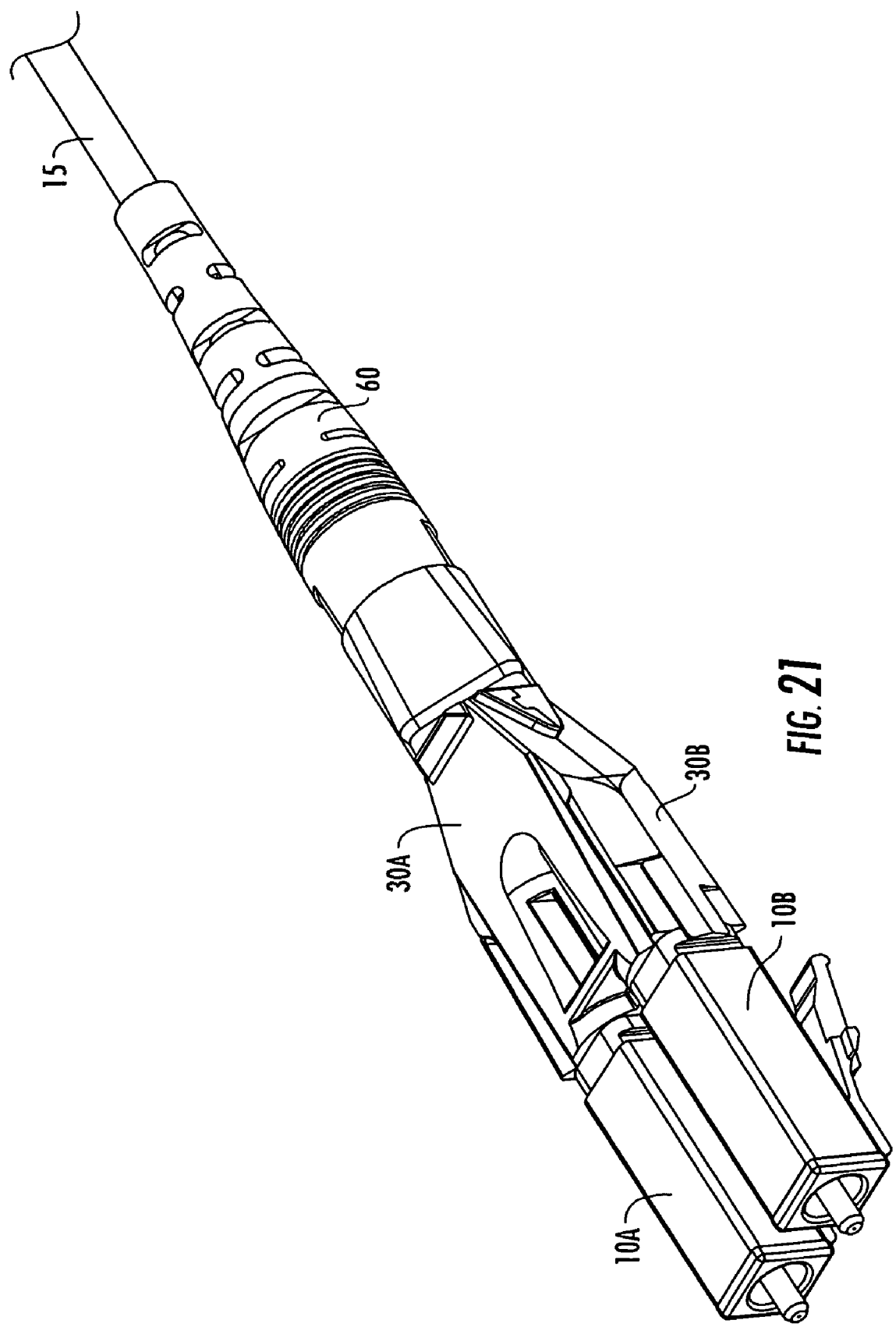
FIG. 21 shows the polarity reversal procedure of FIG. 20 after both the fiber optic connector assemblies are fully rotated during the polarity reversal procedure.
Figure 22:
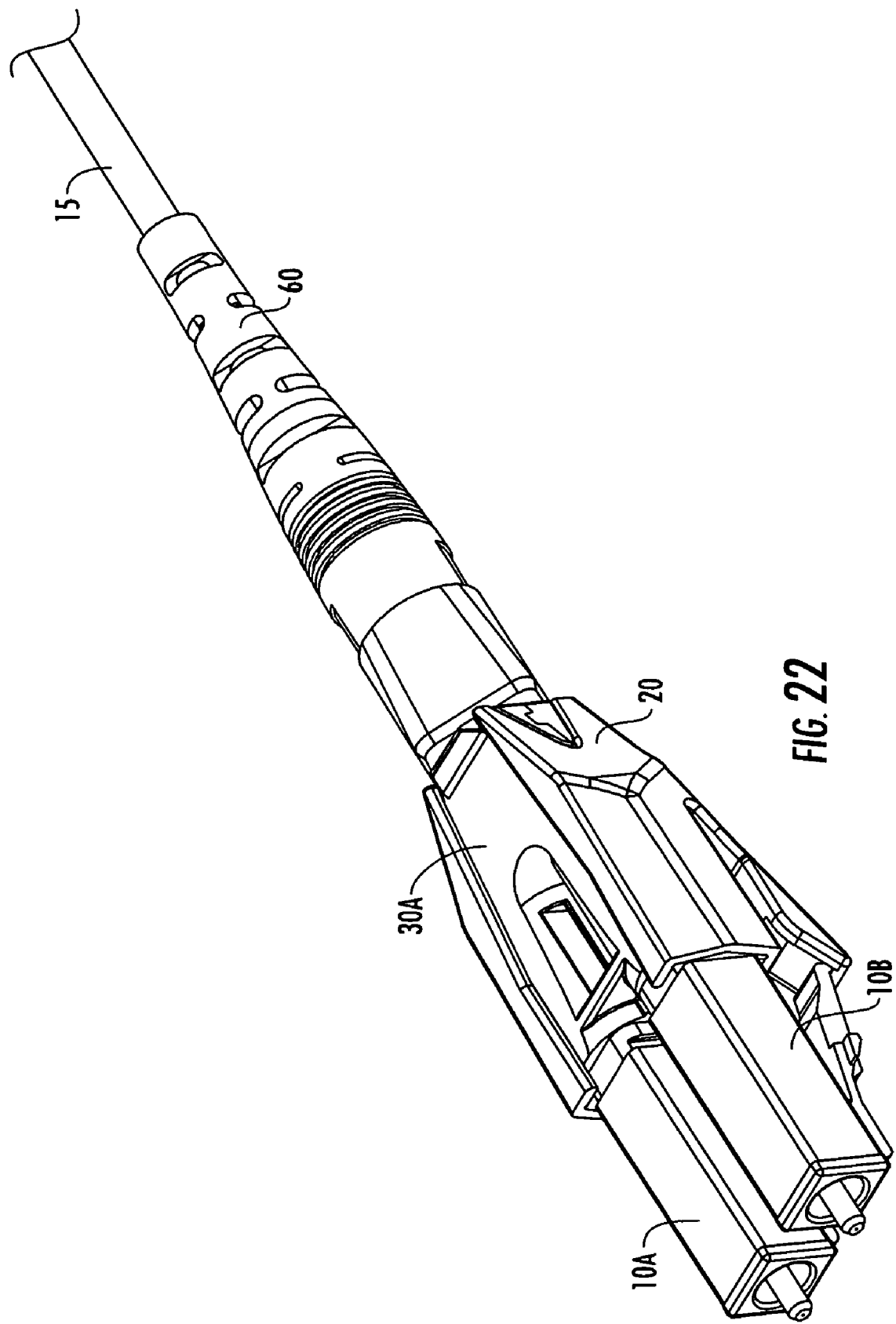
FIG. 22 shows the polarity reversal procedure of FIG. 21 after both the fiber optic connector assemblies are completely rotated and the trigger mechanism is reinstalled in the new orientation about the housing and rotated fiber optic connector assemblies.
Figure 23:
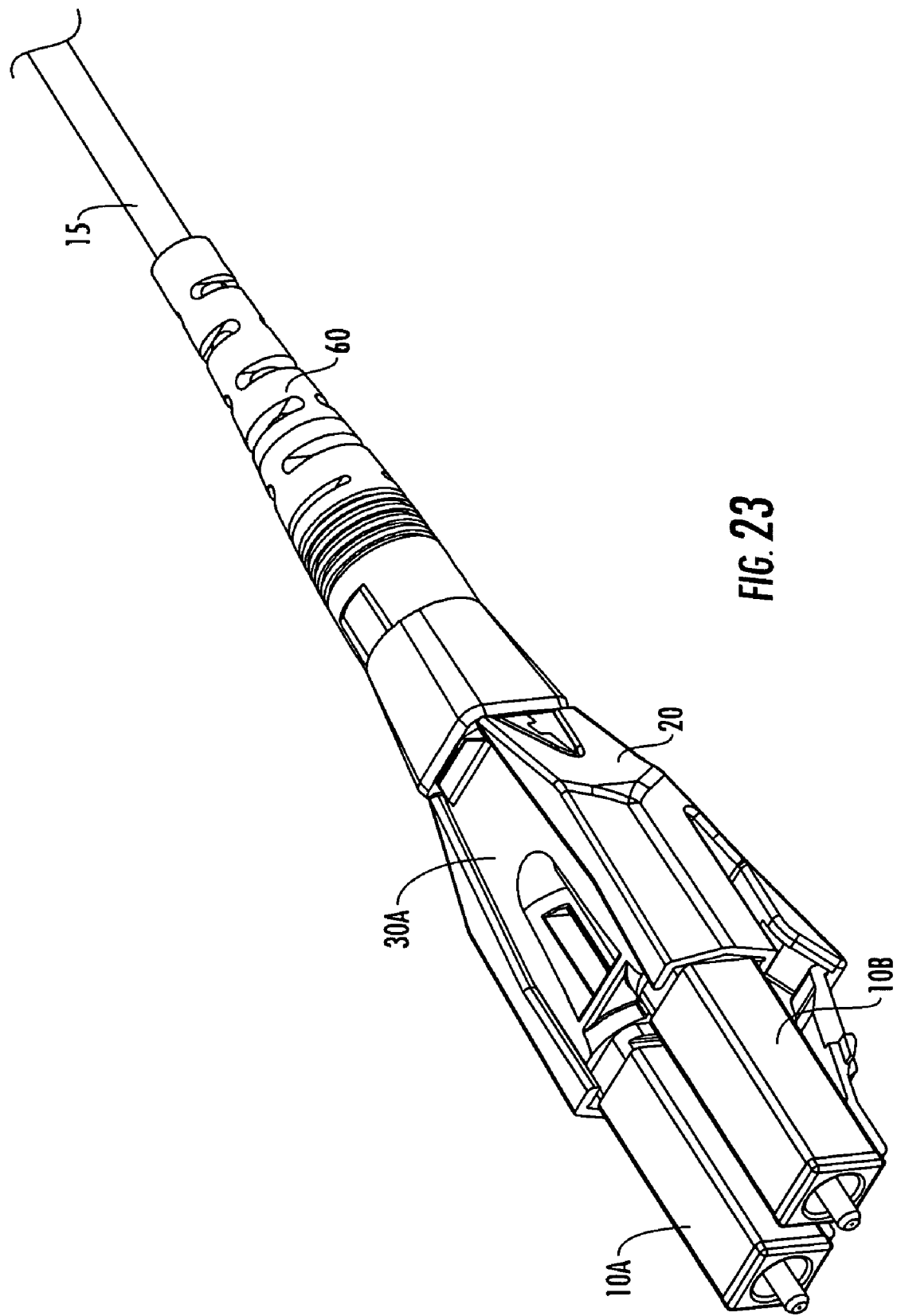
FIG. 23 shows the polarity reversal procedure of FIG. 22 after the boot rotated to the closed position relative to the trigger mechanism.

Thereafter, fiber optic connector assembly 10A is rotated about 180 degrees as shown in FIG. 21, but in the opposite direction of fiber optic connector assembly 10B. Consequently, both of the fiber optic connector assemblies 10A and 10B are about 180 degrees from their initial position. Next, trigger mechanism 20 is reinstalled as described above, but on the other side of the connector housing so that it engages the latches of the fiber optic connector assemblies. FIG. 22 shows the newly installed trigger mechanism 20 on the assembly after polarity reversal, but still in its original view for clarity, and prior to boot 60 rotation. FIG. 23 shows the assembly after boot 60 rotation. The entire assembly is rotated about 180 degrees in FIG. 24, thereby revealing the polarity reversal for duplex fiber optic cable assembly 120. In other words, the 'A' and 'B' positions of the fiber optic connectors are reversed. Housing component 30B, now oriented atop housing 30, includes a polarity reversal indicator 30B' to alert the craft that duplex fiber optic connector assembly 100 has had its polarity reversed. Polarity reversal indicator 30B' is shown as an indentation on housing component 30B, rendering 30B and 30A not identical in this embodiment. Polarity reversal indicator 30B' in further embodiments could also be located on other components and could comprise either of an indentation, a letter, a groove, a bump, a paint dot, or any combination of the same.

The polarity reversal procedure is completely reversible and in no way affects the performance of the fiber optic connector assemblies used in the duplex assembly. While optical fibers 16A and 16B may undergo a maximum of about 180 degrees of rotation, assembly methods can reduce the maximum rotation experienced, thereby mitigating any torsional affects. For instance, the fiber optic connector assemblies may be installed such that when in a relaxed state, the connectors are oriented at 9 o'clock and 3 o'clock (i.e., positioned in the outward direction instead of up or down), whereas for illustration the connectors are shown both at 12 o'clock in this disclosure. Consequently, the optical fibers only experience a net rotation of only +90° or −90° in any polarity orientation.

The assemblies disclosed herein can use any suitable optical fiber. However, the assemblies of the disclosure may further benefit from the use of bend resistant optical fiber such as that disclosed in U.S. patent application Ser. No. 12/250987, filed Oct. 14, 2008, by Corning Incorporated, included herein by reference. Bend resistant multimode optical fibers may comprise a graded-index core region and a cladding region surrounding and directly adjacent to the core region, the cladding region comprising a depressed-index annular portion comprising a depressed relative refractive index relative to another portion of the cladding. The depressed-index annular portion of the cladding is preferably spaced apart from the core. Preferably, the refractive index profile of the core has a parabolic or substantially curved shape. The depressed-index annular portion may, for example, comprise a) glass comprising a plurality of voids, or b) glass doped with one or more downdopants such as fluorine, boron, individually or mixtures thereof The depressed-index annular portion may have a refractive index delta less than about −0.2% and a width of at least about 1 micron, said depressed-index annular portion being spaced from said core by at least about 0.5 microns.

In some embodiments that comprise a cladding with voids, the voids in some preferred embodiments are non-periodically located within the depressed-index annular portion. By "non-periodically located" we mean that when one takes a cross section (such as a cross section perpendicular to the longitudinal axis) of the optical fiber, the non-periodically disposed voids are randomly or non-periodically distributed across a portion of the fiber (e.g. within the depressed-index annular region). Similar cross sections taken at different points along the length of the fiber will reveal different randomly distributed cross-sectional hole patterns, i.e., various cross sections will have different hole patterns, wherein the distributions of voids and sizes of voids do not exactly match for each such cross section. That is, the voids are non-periodic, i.e., they are not periodically disposed within the fiber structure. These voids are stretched (elongated) along the length (i.e. generally parallel to the longitudinal axis) of the optical fiber, but do not extend the entire length of the entire fiber for typical lengths of transmission fiber. It is believed that the voids extend along the length of the fiber a distance less than about 20 meters, more preferably less than about 10 meters, even more preferably less than about 5 meters, and in some embodiments less than 1 meter.

The multimode optical fiber disclosed herein exhibits very low bend induced attenuation, in particular very low macrobending induced attenuation. In some embodiments, high bandwidth is provided by low maximum relative refractive index in the core, and low bend losses are also provided. Consequently, the multimode optical fiber may comprise a graded index glass core; and an inner cladding surrounding and in contact with the core, and a second cladding comprising a depressed-index annular portion surrounding the inner cladding, said depressed-index annular portion having a refractive index delta less than about −0.2% and a width of at least 1 micron, wherein the width of said inner cladding is at least about 0.5 microns and the fiber further exhibits a 1 turn, 10 mm diameter mandrel wrap attenuation increase of less than or equal to about 0.4 dB/turn at 850 nm, a numerical aperture of greater than 0.14, more preferably greater than 0.17, even more preferably greater than 0.18, and most preferably greater than 0.185, and an overfilled bandwidth greater than 1.5 GHz-km at 850 nm.

50 micron diameter core multimode fibers can be made which provide (a) an overfilled (OFL) bandwidth of greater than 1.5 GHz-km, more preferably greater than 2.0 GHz-km, even more preferably greater than 3.0 GHz-km, and most preferably greater than 4.0 GHz-km at an 850 nm wavelength. These high bandwidths can be achieved while still maintaining a 1 turn, 10 mm diameter mandrel wrap attenuation increase at an 850 nm wavelength of less than 0.5 dB, more preferably less than 0.3 dB, even more preferably less than 0.2 dB, and most preferably less than 0.15 dB. These high bandwidths can also be achieved while also maintaining a 1 turn, 20 mm diameter mandrel wrap attenuation increase at an 850 nm wavelength of less than 0.2 dB, more preferably less than 0.1 dB, and most preferably less than 0.05 dB, and a 1 turn, 15 mm diameter mandrel wrap attenuation increase at an 850 nm wavelength, of less than 0.2 dB, preferably less than 0.1 dB, and more preferably less than 0.05 dB. Such fibers are further capable of providing a numerical aperture (NA) greater than 0.17, more preferably greater than 0.18, and most preferably greater than 0.185. Such fibers are further simultaneously capable of exhibiting an OFL bandwidth at 1300 nm which is greater than about 500 MHz-km, more preferably greater than about 600 MHz-km, even more preferably greater than about 700 MHz-km. Such fibers are further simultaneously capable of exhibiting minimum calculated effective modal bandwidth (Min EMBc) bandwidth of greater than about 1.5 MHz-km, more preferably greater than about 1.8 MHz-km and most preferably greater than about 2.0 MHz-km at 850 nm.

Preferably, the multimode optical fiber disclosed herein exhibits a spectral attenuation of less than 3 dB/km at 850 nm, preferably less than 2.5 dB/km at 850 nm, even more preferably less than 2.4 dB/km at 850 nm and still more preferably less than 2.3 dB/km at 850 nm. Preferably, the multimode optical fiber disclosed herein exhibits a spectral attenuation of less than 1.0 dB/km at 1300 nm, preferably less than 0.8 dB/km at 1300 nm, even more preferably less than 0.6 dB/km at 1300 nm.

In some embodiments, the numerical aperture ("NA") of the optical fiber is preferably less than 0.23 and greater than 0.17, more preferably greater than 0.18, and most preferably less than 0.215 and greater than 0.185.

In some embodiments, the core extends radially outwardly from the centerline to a radius R1, wherein 10≦R1≦40 microns, more preferably 20≦R1≦40 microns. In some embodiments, 22≦R1≦34 microns. In some preferred embodiments, the outer radius of the core is between about 22 to 28 microns. In some other preferred embodiments, the outer radius of the core is between about 28 to 34 microns.

In some embodiments, the core has a maximum relative refractive index, less than or equal to 1.2% and greater than 0.5%, more preferably greater than 0.8%. In other embodiments, the core has a maximum relative refractive index, less than or equal to 1.1% and greater than 0.9%.

In some embodiments, the optical fiber exhibits a 1 turn, 10 mm diameter mandrel attenuation increase of no more than 1.0 dB, preferably no more than 0.6 dB, more preferably no more than 0.4 dB, even more preferably no more than 0.2 dB, and still more preferably no more than 0.1 dB, at all wavelengths between 800 and 1400 nm.

Figure 25:
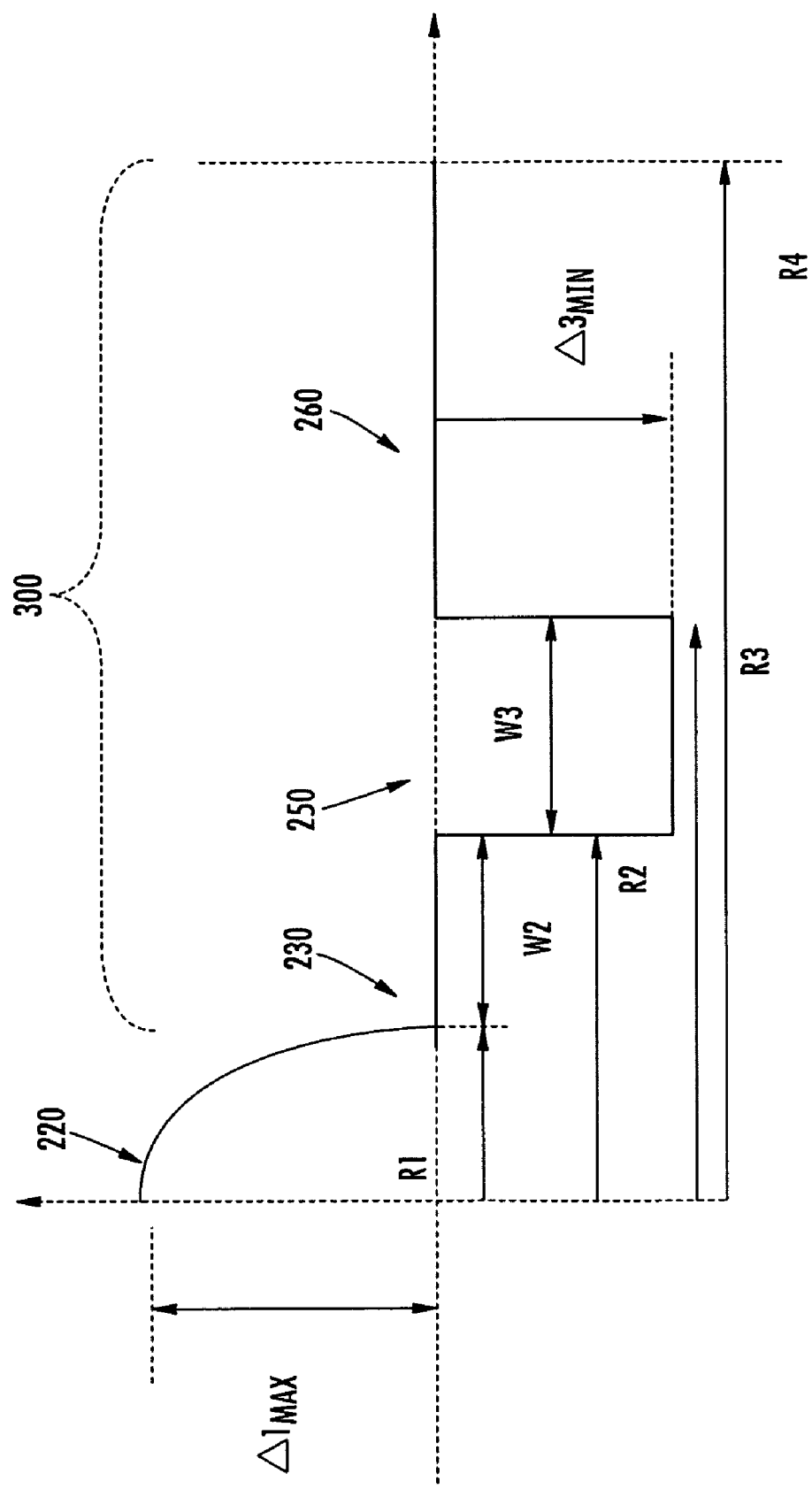
FIG. 25 shows a schematic representation of the refractive index profile of a cross-section of the glass portion of an exemplary embodiment of multimode optical fiber disclosed herein wherein the depressed-index annular portion is offset from the core and is surrounded by an outer annular portion.

FIG. 25 shows a schematic representation of the refractive index profile of a cross-section of the glass portion of an embodiment of a multimode optical fiber 200 comprising a glass core 220 and a glass cladding 300, the cladding comprising an inner annular portion 230, a depressed-index annular portion 250, and an outer annular portion 260. FIG. 26 is a schematic representation (not to scale) of a cross-sectional view of the optical waveguide fiber of FIG. 25. The core 220 has outer radius R1 and maximum refractive index delta Δ1MAX. The inner annular portion 230 has width W2 and outer radius R2. Depressed-index annular portion 250 has minimum refractive index delta percent Δ3MIN, width W3 and outer radius R3. The depressed-index annular portion 250 is shown offset, or spaced away, from the core 220 by the inner annular portion 230. The annular portion 250 surrounds and contacts the inner annular portion 230. The outer annular portion 260 surrounds and contacts the annular portion 250. The clad layer 300 is surrounded by at least one coating 310, which may in some embodiments comprise a low modulus primary coating and a high modulus secondary coating.

Figure 24:
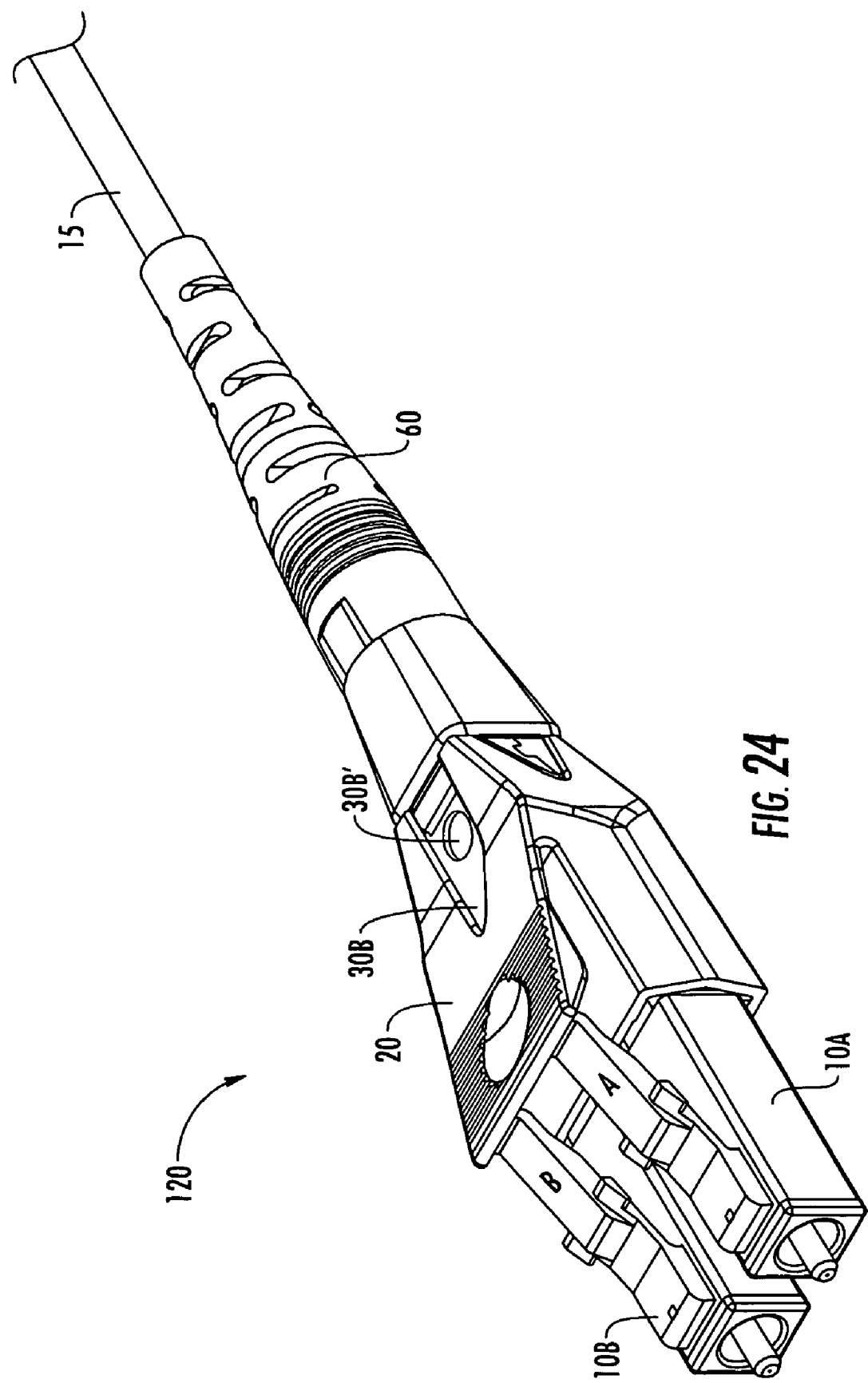
FIG. 24 is a top perspective view of the duplex fiber optic connector assembly of FIG. 22 after the polarity reversal is completed.

The inner annular portion 230 has a refractive index profile $\Delta 2(r)$ with a maximum relative refractive index Δ2MAX, and a minimum relative refractive index Δ2MIN, where in some embodiments Δ2MAX=Δ2MIN. The depressed-index annular portion 250 has a refractive index profile $\Delta 3(r)$ with a minimum relative refractive index Δ3MIN. The outer annular portion 260 has a refractive index profile $\Delta 4(r)$ with a maximum relative refractive index Δ4MAX, and a minimum relative refractive index Δ4MIN, where in some embodiments Δ4MAX=Δ4MIN. Preferably, Δ1MAX>Δ2MAX>Δ3MIN. In some embodiments, the inner annular portion 230 has a substantially constant refractive index profile, as shown in FIG. 24 with a constant $\Delta 2(r)$; in some of these embodiments, $\Delta 2(r)=0\%$. In some embodiments, the outer annular portion 260 has a substantially constant refractive index profile, as shown in FIG. 25 with a constant $\Delta 4(r)$; in some of these embodiments, $\Delta 4(r)=0\%$. The core 220 has an entirely positive refractive index profile, where $\Delta 1(r)>0\%$. R1 is defined as the radius at which the refractive index delta of the core first reaches value of 0.05%, going radially outwardly from the centerline. Preferably, the core 220 contains substantially no fluorine, and more preferably the core 220 contains no fluorine. In some embodiments, the inner annular portion 230 preferably has a relative refractive index profile $\Delta 2(r)$ having a maximum absolute magnitude less than 0.05%, and Δ2MAX<0.05% and Δ2MIN>−0.05%, and the depressed-index annular portion 250 begins where the relative refractive index of the cladding first reaches a value of less than −0.05%, going radially outwardly from the centerline. In some embodiments, the outer annular portion 260 has a relative refractive index profile $\Delta 4(r)$ having a maximum absolute magnitude less than 0.05%, and Δ4MAX<0.05% and Δ4MIN>−0.05%, and the depressed-index annular portion 250 ends where the relative refractive index of the cladding first reaches a value of greater than −0.05%, going radially outwardly from the radius where Δ3MIN is found.

Although the disclosure has been illustrated and described herein with reference to preferred embodiments and specific examples thereof, it will be readily apparent to those of ordinary skill in the art that other embodiments and examples can perform similar functions and/or achieve like results. It is likewise understood that the apparatus of the disclosure can use any suitable single-mode optical fiber, such as CORNING® SMF-28™ or CORNING® CLEARCURVE®, or any suitable multi-mode optical fiber, such as CORNING® INFINICOR® or CORNING® CLEARCURVE® OM3/OM4. Further embodiments may comprise similar components, features and/or methods configured to use two distinct cables instead of the single cable depicted. All such equivalent embodiments and examples are within the spirit and scope of the disclosure and are intended to be covered by the appended claims. It will also be apparent to those skilled in the art that various modifications and variations can be made to the present invention without departing from the spirit and scope of the same. Thus, it is intended that the present invention cover the modifications and variations of this invention provided they come within the scope of the appended claims and their equivalents.

What is claimed is:

1. A duplex fiber optic connector assembly suitable for polarity reversal, comprising:
   a first fiber optic connector assembly;
   a second fiber optic connector assembly; and
   a housing having a first aperture and a second aperture for respectively receiving the first and the second fiber optic connector assemblies such that the fiber optic connector assemblies may be caused to independently rotate along their respective longitudinal axes within the respective first and second apertures for polarity reversal.

2. The duplex fiber optic connector assembly of claim 1, the housing further having a crimp body on a second end for receiving a fiber optic cable.

3. The duplex fiber optic connector assembly of claim 1, the housing further including at least one resilient member.

4. The duplex fiber optic connector assembly of claim 3, wherein the resilient member is integral to the housing.

5. The duplex fiber optic connector assembly of claim 3, wherein the resilient member serves as a detent.

6. The duplex fiber optic connector assembly of claim 3, wherein the resilient member provides an audible click.

7. The duplex fiber optic connector assembly of claim 3, wherein the resilient member is a cantilevered leaf spring.

8. The duplex fiber optic connector assembly of claim 1, wherein the housing is an assembly having at least a first component and a second component.

9. The duplex fiber optic connector assembly of claim 8, wherein the first component and the second component at least partially define a crimp body on a portion of the housing.

10. The duplex fiber optic connector assembly of claim 8, wherein the first component and the second component are secured to each other by means of at least one latch on one component cooperating with at least one corresponding latch aperture on the other component.

11. The duplex fiber optic connector assembly of claim 8, the first component and the second component of the housing assembly having integral alignment features.

12. The duplex fiber optic connector assembly of claim 8, the first component and the second component are identical.

13. The duplex fiber optic connector assembly of claim 1, wherein the first fiber optic connector assembly and the second fiber optic connector assembly are LC connector assemblies.

14. The duplex fiber optic connector assembly of claim 1, further including a trigger mechanism.

15. The duplex fiber optic connector assembly of claim 14, the housing further having at least one retention feature that cooperates with the trigger mechanism.

16. The duplex fiber optic connector assembly of claim 14, wherein the trigger mechanism is removably attached to the housing.

17. The duplex fiber optic connector assembly of claim 14, the trigger mechanism including:
   a shell with a passage extending longitudinally throughout;
   a flexible arm attached to the shell and extending angularly from it; and
   a lateral opening opposite the flexible arm for receiving a fiber optic cable.

18. The duplex fiber optic connector assembly of claim 14, the trigger mechanism further having at least one longitudinal alignment feature that cooperates with at least one corresponding longitudinal alignment feature on the housing.

19. The duplex fiber optic connector assembly of claim 14, the housing further including at least one resilient member and the trigger mechanism inhibiting flexure of the at least one resilient member.

20. The duplex fiber optic connector assembly of claim 14, wherein the trigger mechanism clamps the housing about the first and second fiber optic connector assemblies frictionally inhibiting rotation of the first and second fiber optic connector assemblies.

21. The duplex fiber optic connector assembly of claim 1, wherein the duplex fiber optic connector assembly is a portion of a fiber optic cable assembly.

22. The duplex fiber optic connector assembly of claim 21, the fiber optic cable assembly further including a crimp band and a boot.

23. The duplex fiber optic connector assembly of claim 22, further including a trigger mechanism having at least one standoff for abutting with the boot.

24. The duplex fiber optic connector assembly of claim 22, wherein the trigger mechanism may translate axially over the boot.

25. A fiber optic cable assembly suitable for polarity reversal, comprising:
    a fiber optic cable;
    a duplex fiber optic connector assembly suitable for polarity reversal, comprising:
        a first fiber optic connector assembly;
        a second fiber optic connector assembly; and
        a housing having a first aperture and a second aperture for respectively receiving the first and the second fiber optic connectors such that the fiber optic connectors may be caused to independently rotate along their respective longitudinal axes within the respective first and second apertures for polarity reversal.

26. The fiber optic cable assembly of claim 25, further including a trigger mechanism and a boot.

27. The fiber optic cable assembly of claim 25, the housing having indicia on at least a side to indicate polarity status.

28. The fiber optic cable assembly of claim 25, wherein the first and the second fiber optic connector assemblies are LC connector assemblies.

29. The fiber optic cable assembly of claim 25, further including a trigger mechanism including:
    a shell with a passage extending longitudinally throughout;
    a flexible arm attached to the shell and extending angularly from it, that engages a latch arm on each of the first and the second fiber optic fiber optic connector assemblies, the flexible arm having partitions defining cavities to receive the latch arm; and
    a lateral opening opposite the flexible arm for receiving the fiber optic cable.

30. The fiber optic cable assembly of claim 29, wherein the partitions provide torque resistance to the first and second fiber optic cable assemblies.

31. The fiber optic cable assembly of claim 25, the boot having a proximal end cross section that is substantially rectangular and a distal end cross section that is substantially round.

32. The fiber optic cable assembly of claim 31, wherein the proximal end of the boot is substantially flat perpendicular to the longitudinal axis and adjoins the fiber optic connector assembly.

33. The fiber optic cable assembly of claim 25, wherein the boot is rotatable along the longitudinal axis of the fiber optic cable.

34. The fiber optic cable assembly of claim 25, the fiber optic cable having at least one unbuffered optical fiber disposed within a jacket.

35. A duplex connector housing assembly suitable for polarity reversal, comprising:
    a housing having a through passage, two apertures on a first end, a crimp body formed at the outer periphery of the housing on a second end opposite the first end, and at least one integral resilient member, wherein the integral resilient member serves as a detent for the rotation of one or more fiber optic connector assemblies within one of the two apertures during polarity reversal.

36. The duplex connector housing assembly of claim 35, wherein the housing is a housing assembly having at least a first component and a second component.

37. The duplex connector housing assembly of claim 35, further including a trigger mechanism and a boot.

38. The duplex connector housing assembly of claim 35, further including a first and a second fiber optic connector assemblies, wherein the first and second fiber optic cable assembles are LC connector assemblies.

39. The duplex connector housing assembly of claim 35, wherein the duplex connector housing is a portion of a fiber optic cable assembly.

40. A method of polarity reversal for a duplex fiber optic cable assembly comprising the steps of:
    rotating a first fiber optic connector assembly within a first aperture of a housing; and
    rotating a second fiber optic connector assembly within a second aperture of the housing, wherein the first and the second fiber optic connector assemblies are rotated in opposite directions from each other.

41. The method of claim 40, further including the steps of:
    removing a trigger mechanism;
    rotating the trigger mechanism about 180 degrees;
    replacing the trigger mechanism onto the housing.

42. The method of claim 41, further including the step of rotating a boot.

43. The method of claim 42, wherein the boot is rotated at least about 45 degrees.

* * * * *